(12) United States Patent
Kim et al.

(10) Patent No.: US 12,032,403 B2
(45) Date of Patent: Jul. 9, 2024

(54) DISPLAY DEVICE INCLUDING A SLIDING DISPLAY PANEL

(71) Applicant: SAMSUNG DISPLAY CO., LTD., Yongin-si (KR)

(72) Inventors: Tae Chang Kim, Anyang-si (KR); Tae Hoon Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/814,141

(22) Filed: Jul. 21, 2022

(65) Prior Publication Data

US 2023/0176614 A1 Jun. 8, 2023

(30) Foreign Application Priority Data

Dec. 7, 2021 (KR) .................. 10-2021-0173788

(51) Int. Cl.
*G06F 1/16* (2006.01)
(52) U.S. Cl.
CPC .......... *G06F 1/1624* (2013.01); *G06F 1/1656* (2013.01)
(58) Field of Classification Search
CPC .... G06F 1/1624; G06F 1/1652; G06F 1/1656; G06F 9/301; G09F 9/33; G09F 9/335
See application file for complete search history.

(56) References Cited

U.S. PATENT DOCUMENTS

| | | | | |
|---|---|---|---|---|
| 2012/0162876 A1* | 6/2012 | Kim | ...................... | G06F 1/1652 361/679.01 |
| 2015/0062467 A1* | 3/2015 | Kang | .................... | G06F 3/0446 349/12 |
| 2016/0179257 A1* | 6/2016 | Im | ........................ | G06F 1/1616 345/173 |
| 2017/0317299 A1* | 11/2017 | Choi | ..................... | H10K 77/111 |
| 2018/0081473 A1* | 3/2018 | Seo | ........................ | G06F 1/3287 |
| 2018/0103550 A1* | 4/2018 | Seo | ........................ | H01F 7/0205 |
| 2018/0103552 A1* | 4/2018 | Seo | ........................ | H05K 5/0017 |
| 2020/0341514 A1* | 10/2020 | Li | ........................ | G06F 1/1652 |

FOREIGN PATENT DOCUMENTS

| | | | | | |
|---|---|---|---|---|---|
| CN | 113259511 | * | 8/2021 | ......... | H04M 1/0237 |
| CN | 113259511 A | * | 8/2021 | | |
| KR | 10-2016-0031363 | | 3/2016 | | |
| KR | 10-2017-0026747 | | 3/2017 | | |
| KR | 101784880 B1 | * | 10/2017 | .......... | G06F 1/1641 |
| KR | 10-2018-0040181 | | 4/2018 | | |
| KR | 10-2021-0059484 | | 5/2021 | | |
| WO | WO-2021066256 A1 | * | 4/2021 | .......... | G06F 1/1652 |

* cited by examiner

*Primary Examiner* — Rockshana D Chowdhury
*Assistant Examiner* — Martin Antonio Asmat Uceda
(74) *Attorney, Agent, or Firm* — F. Chau & Associates, LLC

(57) ABSTRACT

A display device includes a display panel including a first active area, a second active area configured to slide in the first direction, a third active area configured to slide in the first direction, a first dummy area, and a second dummy area. A plurality of joints extend in a second direction intersecting the first direction, are spaced apart from each other in the first direction, are attached to a bottom surface of the display panel, and overlap the second active area, the third active area, the first dummy area, and the second dummy area. A first fixing tool and a second fixing tool are disposed on the first and second dummy area of the display panel, respectively, and are configured to assist a sliding behavior of the display panel.

18 Claims, 16 Drawing Sheets

1000: AA, NAA, SBA
AA: 1100, 1200, 1300
NAA: 1400, 1500
1400: 1400a, 1400b
1400a: 1410a, 1420a, 1430a
1400b: 1410b, 1420b, 1430b
1500: 1510, 1520

1510: 1510a, 1510b
1520: 1520a, 1520b
H_2: H_2a, H_2b
2000: 2100, 2200, 2300
2200: 2210, 2220
2300: 2310, 2320
3000: 3100, 3200
R: R1, R2

DISPLAY DEVICE INCLUDING A SLIDING DISPLAY PANEL

CROSS-REFERENCE TO RELATED APPLICATION

This application claims priority under 35 U.S.C. § 119 to Korean Patent Application No. 10-2021-0173788 filed on Dec. 7, 2021 in the Korean Intellectual Property Office, the contents of which are herein incorporated by reference in its entirety.

TECHNICAL FIELD

The present disclosure relates to a display device and, more specifically, to a display device including a sliding display panel.

DISCUSSION OF THE RELATED ART

Display devices of various types are in wide use today. Examples of display devices include an organic light emitting diode (OLED) display and a liquid crystal display (LCD).

In recent years, flexible display devices have been developed. Flexible display devices may be configured to expand or contract a perceivable area of the display screen. This may be achieved, for example, by folding, bending, or sliding the display screen to allow for the development of electronic devices with smaller and more interesting form factors, even while providing a larger display area.

SUMMARY

A display device includes a display panel including a first active area, a second active area disposed on one side of the first active area in a first direction and configured to slide in the first direction, a third active area disposed on an opposite side of the second active area with the first active area interposed therebetween and configured to slide in the first direction, a first dummy area disposed on an opposite side of the first active area with the second active area interposed therebetween, and a second dummy area disposed on the opposite side of the first active area with the third active area interposed therebetween. A joint part includes a plurality of joints extending in a second direction intersecting the first direction and spaced apart from each other in the first direction, and attached to a bottom surface of the display panel overlapping the second active area, the third active area, the first dummy area, and the second dummy area. A first fixing tool is disposed on the first dummy area of the display panel and is configured to assist a sliding behavior of the display panel. A second fixing tool is disposed on the second dummy area of the display panel and is configured to assist the sliding behavior of the display panel.

The first dummy area may include a first dummy bendable area adjacent to the second active area and a first dummy flat area disposed on the opposite side of the second active area with the first dummy bendable area interposed therebetween. The second dummy area may include a second dummy bendable area adjacent to the third active area and a second dummy flat area disposed on an opposite side of the third active area with the second dummy bendable area interposed therebetween. The joint part may be disposed on a bottom surface of the first dummy bendable area and a bottom surface of the second dummy bendable area, and might not overlap the first dummy flat area or the second dummy flat area.

The display device may further include a first lower plate disposed on a bottom surface of the first dummy flat area and might not overlap the first dummy bendable area. A second lower plate may be disposed on a bottom surface of the second dummy flat area and might not overlap the second dummy bendable area.

The first fixing tool may be disposed on the first dummy flat area and the second fixing tool may be disposed on the second dummy flat area.

The first dummy flat area may include a first dummy end surface opposite to a boundary surface between the first dummy flat area and the first dummy bendable area. The second dummy flat area may include a second dummy end surface opposite to a boundary surface between the second dummy flat area and the second dummy bendable area. The first dummy end surface and the second dummy end surface may be disposed on a same plane in a state in which the display panel is contracted.

The display device may further include a panel storage container accommodating the display panel. The panel storage container may include a first bent portion forming a first display device bent area in which the second active area of the display panel is bent while having a predetermined radius of curvature. The first display device bent area may include a first maximum bent portion in which the second active area of the display panel is maximally bent. The first dummy area may be slid up to the first maximum bent portion in a third state in which the display panel is maximally slid in the first direction.

One plane passing through the first maximum bent portion may pass through a boundary between the second active area and the first dummy area.

The first maximum bent portion may be positioned at a center of the first display device bent area.

A length of the first dummy area may be greater than or equal to a value obtained by multiplying a radius of curvature of the first display device bent area by $\pi/2$.

A display device includes a display panel including an active area in which pixels are disposed, a dummy area disposed adjacent to one side of the active area in a first direction and the other side of the active area in the first direction, and a sub-area protruding from the active area in a second direction intersecting the first direction. A support module is attached to a bottom surface of the display panel. The dummy area includes a first dummy bendable area disposed on one side of the active area in the first direction, a first dummy flat area disposed on an opposite side of the active area with the first dummy bendable area interposed therebetween, a second dummy bendable area disposed on the other side of the active area in the first direction, and a second dummy flat area disposed on the opposite side of the active area with the second dummy bendable area interposed therebetween. The support module includes a plurality of joints overlapping the first dummy bendable area, the second dummy bendable area, and the active area and spaced apart from each other in the first direction, and the first dummy flat area includes a first_first hole penetrating through the first dummy flat area, and the second dummy flat area includes a first_second hole penetrating through the second dummy flat area.

The support module may further includes a first lower plate overlapping the first dummy flat area and a second lower plate overlapping the second dummy flat area. The first lower plate may include a second_first hole penetrating through the first lower plate and overlapping the first_first hole, and the second lower plate may include a second_second hole penetrating through the second lower plate and overlapping the first_second hole.

Each of the first_first hole, the first_second hole, the second_first hole, and the second_second hole may have a circular shape in a plan view.

A center of the first_first hole and a center of the second_first hole may overlap each other, and a center of the first_second hole and a center of the second_second hole may overlap each other.

The display device may further include a fixing part configured to slide the display panel in the first direction. The fixing part may include a first fixing tool disposed on the first dummy flat area and a second fixing tool disposed on the second dummy flat area. The first fixing tool may include a first screw fastened to the first_first hole and the second_first hole, and the second fixing tool may include a second screw fastened to the first_second hole and the second_second hole.

The first dummy flat area may include a first dummy end surface opposite to a boundary surface between the first dummy flat area and the first dummy bendable area. The second dummy flat area may include a second dummy end surface opposite to a boundary surface between the second dummy flat area and the second dummy bendable area. The first dummy end surface and the second dummy end surface may be disposed on a same plane in a state in which the display panel is contracted.

The first dummy end surface and the second dummy end surface may be in contact with each other in the state in which the display panel contracted.

A display device includes a display panel including an active area in which pixels are disposed, a dummy area adjacent to one side of the active area in a first direction and the other side of the active area in the first direction, and a sub-area protruding from the active area in a second direction intersecting the first direction. A support module is attached to a bottom surface of the display panel. The dummy area includes a first dummy bendable area disposed on one side of the active area in the first direction, a first dummy flat area disposed on an opposite side of the active area with the first dummy bendable area interposed therebetween, a second dummy bendable area disposed on the other side of the active area in the first direction, and a second dummy flat area disposed on the opposite side of the active area with the second dummy bendable area interposed therebetween. The support module includes a plurality of joints overlapping the first dummy bendable area, the second dummy bendable area, and the active area and spaced apart from each other in the first direction. The first dummy flat area includes a first_first concavo-convex portion having concavities and convexities in the first direction formed at an end of one side of the first dummy flat area. The second dummy flat area includes a first_second concavo-convex portion having concavities and convexities in the first direction formed at an end of the other side of the second dummy flat area.

The support module may further include a first lower plate overlapping the first dummy flat area and a second lower plate overlapping the second dummy flat area. The first lower plate may include a second_first concavo-convex portion having concavities and convexities in the first direction formed at an end of one side of the first lower plate. The second lower plate may include a second_second concavo-convex portion having concavities and convexities in the first direction formed at an end of the other side of the second lower plate. The first_first concavo-convex portion and the second_first concavo-convex portion may be aligned with each other, and the first_second concavo-convex portion and the second_second concavo-convex portion may be aligned with each other.

The display device may further include a fixing part configured to slide the display panel in the first direction. The fixing part may include a first fixing tool disposed on the first dummy flat area and a second fixing tool disposed on the second dummy flat area. The first fixing tool may include a first contact portion fastened to the first_first concavo-convex portion and the second_first concavo-convex portion. The second fixing tool may include a second contact portion fastened to the first_second concavo-convex portion and the second_second concavo-convex portion.

The first dummy flat area may include a first dummy end surface opposite to a boundary surface between the first dummy flat area and the first dummy bendable area. The second dummy flat area may include a second dummy end surface opposite to a boundary surface between the second dummy flat area and the second dummy bendable area. The first dummy end surface and the second dummy end surface may be disposed on a same plane in a first state in which the display panel is not slid in the first direction.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the present disclosure are shown. This invention may, however, be embodied in different forms and should not be construed as necessarily limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same or similar components throughout the specification and figures.

It will be understood that, although the terms "first," "second," etc. may be used herein to describe various elements, these elements should not necessarily be limited by these terms. These terms are only used to distinguish one element from another element. For instance, a first element discussed below could be termed a second element without departing from the teachings of the present disclosure. Similarly, the second element could also be termed the first element.

Features of each of various embodiments of the disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
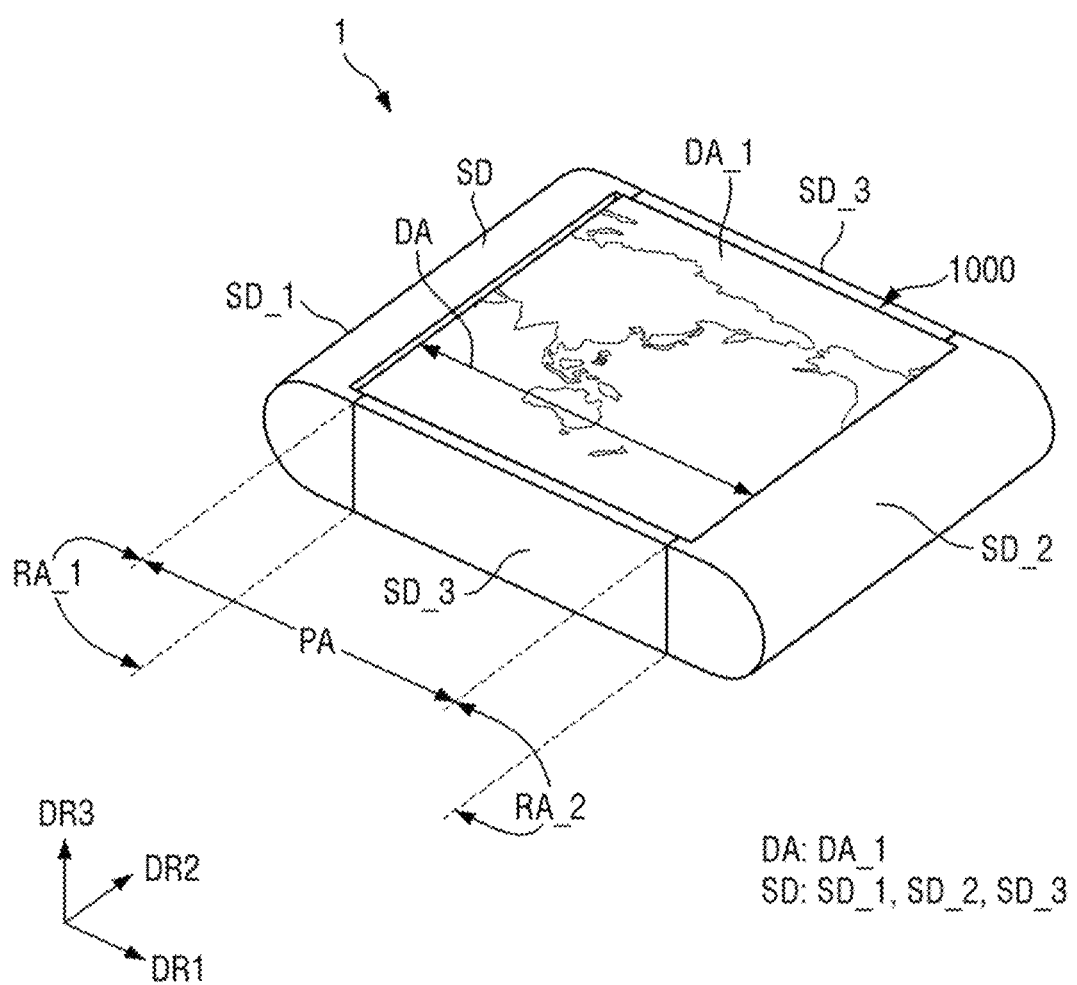
FIG. 1 is a perspective view illustrating a display device in a contracted state according to an embodiment.
Figure 2:
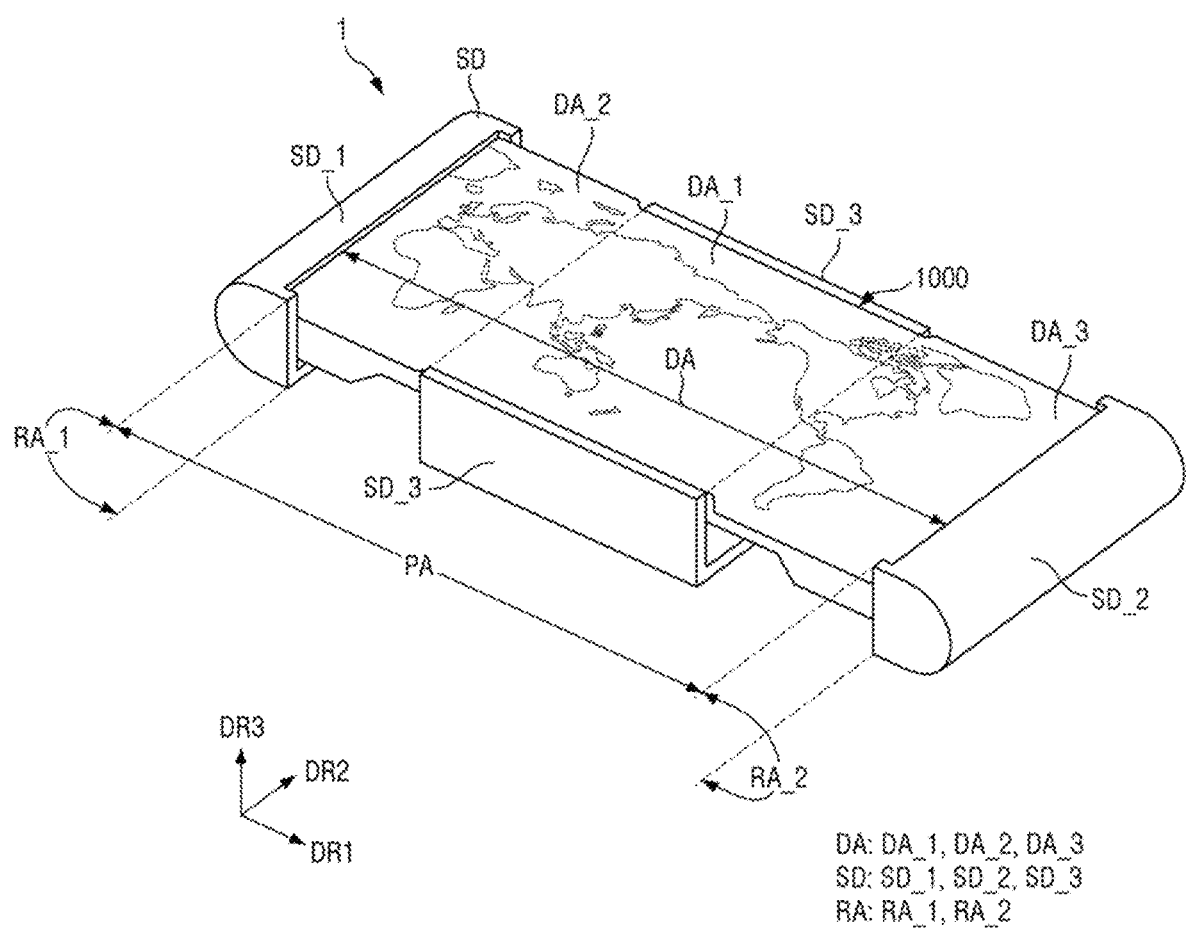
FIG. 2 is a perspective view illustrating the display device of FIG. 1 in an expanded state.
Figure 3:
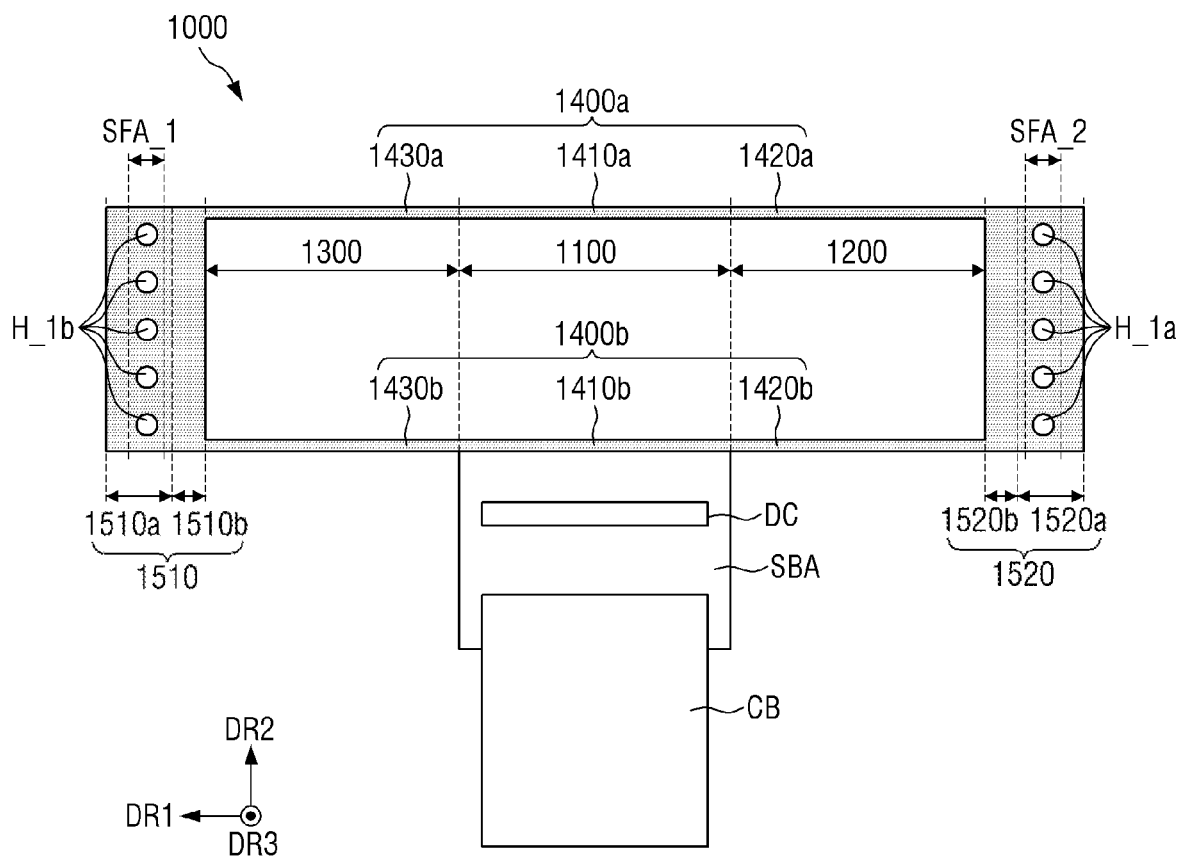
FIG. 3 is a plan view illustrating a display panel of the display device of FIG. 1.
Figure 4:
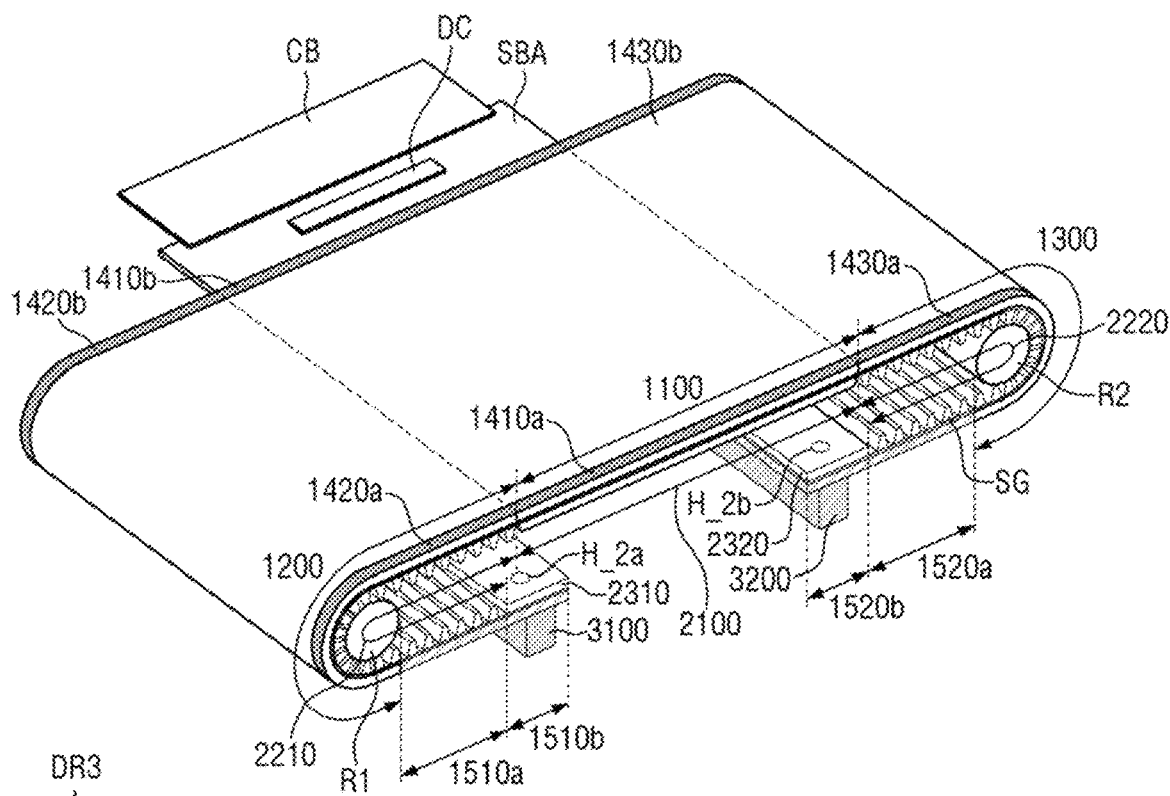
FIG. 4 is a perspective view illustrating a structure of a display panel, a support module, and a fixing part of the display device of FIG. 1.
Figure 5:
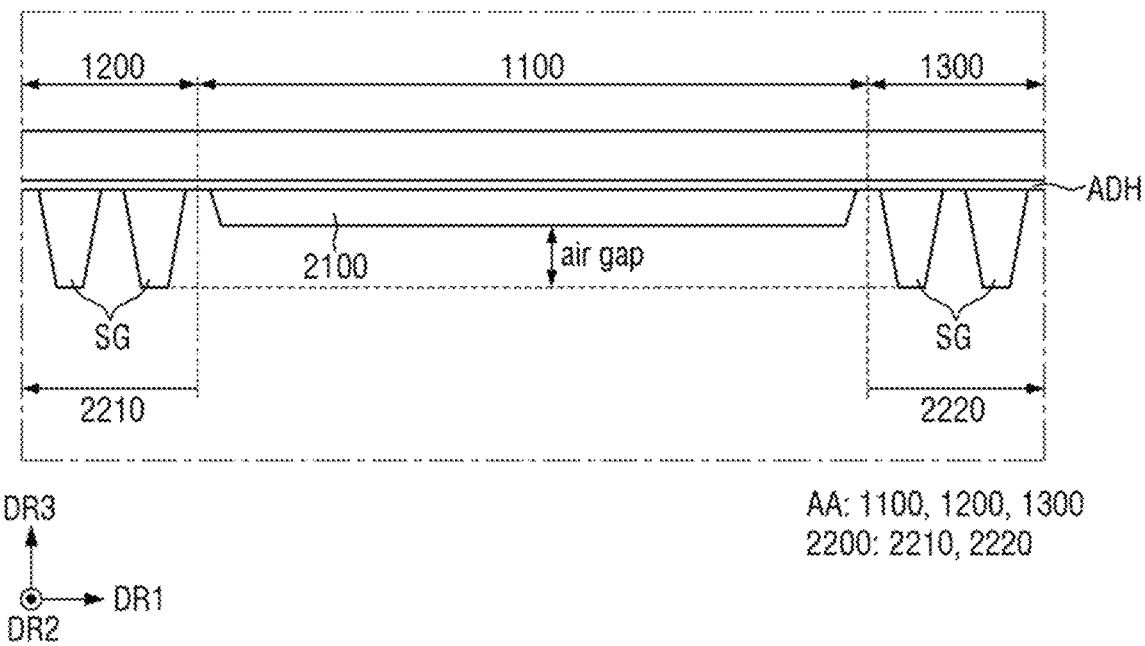
FIG. 5 is a structural view illustrating a schematic structure of the support module.

FIG. 1 is a perspective view illustrating a state in which a display device, according to an embodiment, is not expanded (which may be referred to herein as being in a contracted state). FIG. 2 is a perspective view illustrating a state in which the display device of FIG. 1 is expanded (which may be referred to herein as being in an expanded state). FIG. 3 is a plan view illustrating a display panel of the display device of FIG. 1. FIG. 4 is a perspective view illustrating a structure of a display panel, a support module, and a fixing part of the display device of FIG. 1. FIG. 5 is a structural view illustrating a schematic structure of the support module.

Referring to FIGS. 1 and 2, a display device 1, according to an embodiment, may be a slidable display device. The display device 1, according to an embodiment, may be a multi-slidable display device that slides in both directions.

The display device 1 has a three-dimensional shape. The display device 1 may have a rectangular parallelepiped or a three-dimensional shape similar thereto. In the drawings, a first direction DR1 refers to a direction parallel to a first side (horizontal side) of the display device 1, a second direction DR2 refers to a direction parallel to a second side (vertical side) of a display device 1, and a third direction DR3 refers to a thickness direction of the display device 1. In the following specification, unless otherwise specified, the term "direction" may refer to both directions toward both sides extending along the direction. In addition, when both "directions" extending to both sides need to be distinguished from each other, one side will be referred to as "one side in the direction" and the other side will be referred to as "the other side in the direction". In FIG. 1, an arrow direction will be referred to as one side, and an opposite direction to the arrow direction will be referred to as the other side. A first direction DR1 and a second direction DR2 may be perpendicular to each other, the first direction DR1 and a third direction DR3 may be perpendicular to each other, and the second direction DR2 and the third direction DR3 may be perpendicular to each other.

Referring to FIGS. 1 to 5, the display device 1 may include a display panel 1000, a support module 2000, a fixing part 3000, a roller R, and a panel storage container SD.

The display device 1 may include a display device flat area PA and a display device bent area RA. The display device flat area PA of the display device 1 substantially overlaps an area exposing a display panel 1000 of a panel storage container SD to be described later. The display device bent area RA of the display device 1 may be formed inside the panel storage container SD. The display device bent area RA may be an area in which the display panel 1000 is bent with a predetermined radius of curvature. The display device bent area RA may be disposed on both sides of the display device flat area PA in the first direction DR1. For example, a first display device bent area RA_1 may be disposed on the other side of the display device flat area PA in the first direction DR1, and a second display device bent area RA_2 may be disposed on one side of the display device flat area PA in the first direction DR1. The first display device bent area RA_1 may be an area in which a second active area 1200, which will be described later, is bent. The second display device bent area RA_2 may be an area in which a third active area 1300, which will be described later, is bent. As illustrated in FIG. 2, an area of the display device flat area PA may increase as the display device 1 is expanded. Accordingly, a distance between the first display device bent area RA_1 and the second display device bent area RA_2 may increase.

The display panel 1000 is a panel that displays a screen, and any type of display panel such as an organic light emitting display panel including an organic emission layer, a micro light emitting diode (LED) display panel using a micro light emitting diode, a quantum dot light emitting display panel using a quantum dot light emitting diode including a quantum dot emission layer, and an inorganic light emitting display panel using an inorganic light emitting element including an inorganic semiconductor may be applied as the display panel 1000 according to the present embodiment.

The display panel 1000 may be a flexible panel. The display panel 1000 may have flexibility and may be able to be partially rolled, bent, or warped in the panel storage container SD of the sliding module, without cracking or otherwise sustaining damage, as will be described later. The display panel 1000 may slide in the first direction DR1. In FIG. 3, one side surface of the display panel 1000 in the third direction DR3 may be a top surface for displaying a screen, and the other side surface of the display panel 1000 in the third direction DR3 may be a bottom surface on which the support module 2000 is disposed. The top surface and the bottom surface may also be applied to each area of the display panel 1000 to be described later.

The display panel 1000 may include an active area AA and a non-active area NAA.

The active area AA of the display panel 1000 may be an area in which pixels are disposed. The active area AA may include a first active area 1100 supported by an upper plate 2100, a second active area 1200 supported by a first joint part 2210, and a third active area 1300 supported by a second joint part 2220, which will be described later. The first active area 1100 of the display panel 1000 may be an always flat area capable of maintaining a flat shape regardless of a sliding operation. The second active area 1200 and the third active area 1300 of the display panel 1000 may be rolled, bent, or warped, or may be a bent area or a bendable area in which a rolled, bent, or warped shape and a flat shape are changed according to a sliding operation.

A display area DA of the display panel 1000 may be an area in which a screen is displayed. The display area may be divided into a first display area DA_1, a second display area DA_2, and a third display area DA_3 depending on whether or not the display panel 1000 slides and the degree of sliding of the display panel 1000. The presence or absence of the second display area DA_2 and the third display area DA_3 and the area thereof may vary depending on whether or not the display panel 1000 slides and the degree of sliding of the display panel 1000. For example, in a non-sliding/contracted state (hereinafter, referred to as a "first state"), the display panel 1000 has the first display area DA_1 having a first area. In a sliding/partially-expanded state (hereinafter, referred to as "second state"), the display area further includes the second display area DA_2 and the third display area DA_3 that are expanded, in addition to the first display area DA_1.

The second display area DA_2 may be an area in which the second active area 1200 of the display panel 1000 and the display device flat area PA at least partially overlap, and the third display area DA_3 may be an area in which the third active area 1300 of the display panel 1000 and the display device flat area PA at least partially overlap.

The areas of the second display area DA_2 and the third display area DA_3 may vary according to the degree of sliding. In a state in which the display device 1 is slid to the maximum or fully-expanded state (hereinafter referred to as a "third state"), the second display area DA_2 has a second area and the third display area DA_3 has a third area, and the display area DA has a fourth area that is the sum of the first area, the second area, and the third area. Here, the fourth area may be the maximum area that the display area DA may have.

The first display area DA_1 may at least partially overlap the first active area 1100 of the display panel 1000. The second display area DA_2 may overlap at least a portion of the second active area 1200 of the display panel 1000. The third display area DA_3 may overlap at least a portion of the third active area 1300 of the display panel 1000. In some embodiments, a boundary between the first display area DA_1 and the second display area DA_2 may coincide with a boundary between the first active area 1100 and the second active area 1200, and the boundary between the first display area DA_1 and the second display area DA_2 may coincide with a boundary between the first active area 1100 and the third active area 1300, but the present disclosure is not necessarily limited thereto.

The non-active area NAA of the display panel 1000 may be an area in which pixels are not disposed. Metal wires such as data/scan wires and touch wires may be disposed in the non-active area NAA. The non-active area NAA may include a bezel area 1400 and a dummy area 1500. The non-active area NAA may at least partially surround the active area AA.

The bezel area 1400 may be disposed at ends of both sides of the active area AA in the second direction DR2 as illustrated in FIG. 3. For example, the bezel area 1400 may include a first bezel area 1400*a* disposed at an end of one side of the active area AA in the second direction DR2, and a second bezel area 1400*b* disposed at an end of the other side of the active area AA in the second direction DR2. The first bezel area 1400*a* may include a first_first bezel area 1410*a* disposed at an end of one side of the first active area 1100 in the second direction DR2, a first_second bezel area 1420*a* disposed at an end of one side of the second active area 1200 in the second direction DR2, and a first_third bezel area 1430*a* disposed at an end of one side of the third active area 1300 in the second direction DR2, and the second bezel area 1400*b* may include a second_first bezel area 1410*b* disposed at an end of the other side of the first active area 1100 in the second direction DR2, a second_second bezel area 1420*b* disposed at an end of the other side of the second active area 1200 in the second direction DR2, and a second_third bezel area 1430*b* disposed at an end of the other side of the third active area 1300 in the second direction DR2. For example, the first active area 1100 may be disposed between the first_first bezel area 1410*a* and the second_first bezel area 1410*b*, the second active area 1200 may be disposed between the first_second bezel area 1420*a* and the second_second bezel area 1420*b*, and the third active area 1300 may be disposed between the first_third bezel area 1430*a* and the second_third bezel area 1430*b*.

The dummy area 1500 may be disposed at ends of both sides of the active area AA in the first direction DR1 as illustrated in FIG. 3. For example, the dummy area 1500 may include a first dummy area 1510 disposed at an end of the other side of the second active area 1200 in the first direction DR1, and a second dummy area 1520 disposed at an end of one side of the third active area 1300 in the first direction DR1.

The first dummy area 1510 may include a first dummy bendable area 1510*a* and a first dummy flat area 1510*b*. The first dummy bendable area 1510*a* may be an area in which a first joint part 2210 overlaps, and the first dummy flat area 1510*b* may be an area in which a first lower plate 2310 overlaps. The first dummy bendable area 1510*a* may be disposed at an end of the other side of the second active area 1200 in the first direction DR1, and the first dummy flat area 1510*b* may be disposed at an end of the other side of the first dummy bendable area 1510*a* in the first direction DR1. For example, the first dummy bendable area 1510*a* may be disposed between the second active area 1200 and the first dummy flat area 1510*b*. The first dummy area 1510 may have a first dummy end surface 1510*b*_*a* (see FIG. 7) at an end of the other side thereof in the first direction DR1 with reference to FIG. 3. For example, the first dummy end surface 1510*b*_*a* may be a surface opposite to a boundary surface between the first dummy bendable area 1510*a* and the first dummy flat area 1510*b*.

The second dummy area 1520 may include a second dummy bendable area 1520*a* and a second dummy flat area 1520*b*. The second dummy bendable area 1520*a* may be an area in which a second joint part 2220 overlaps, and the second dummy flat area 1520*b* may be an area in which a second lower plate 2320 overlaps. The second dummy bendable area 1520*a* may be disposed at an end of the other side of the third active area 1300 in the first direction DR1, and the second dummy flat area 1520*b* may be disposed at an end of the other side of the second dummy bendable area 1520*a* in the first direction DR1. For example, the second dummy bendable area 1520*a* may be disposed between the third active area 1300 and the second dummy flat area 1520*b*. The second dummy area 1520 may have a second dummy end surface 1520*b*_*a* (see FIG. 7) at an end of one side thereof in the first direction DR1 with reference to FIG. 3. For example, the second dummy end surface 1520*b*_*a* may be a surface opposite to a boundary surface between the second dummy bendable area 1520*a* and the second dummy flat area 1520*b*.

The first dummy end surface 1510*b*_*a* and the second dummy end surface 1520*b*_*a* may be ends of both sides of the display panel 1000 in the first direction DR1.

A fixing tool fixing area SFA, to which a fixing tool to be described later is fixed, may be disposed on the first dummy flat area 1510*b* and the second dummy flat area 1520*b*. The fixing tool fixing area SFA might not exceed the first dummy flat area 1510*b* and the second dummy flat area 1520*b*. For example, the fixing tool fixing area SFA overlaps the first dummy flat area 1510*b* and the second dummy flat area 1520*b*, and might not overlap the first dummy bendable area 1510*a* and the second dummy bendable area 1520*a*. The fixing tool fixing area SFA may include a first fixing tool fixing area SFA_1 (including SFA1_1 and SFA1_2) on the first dummy flat area 1510*b* and a second fixing tool fixing area SFA_2 (including SFA2_1 and SFA2_2) on the second dummy flat area 1520*b*. It is to be understood that as used herein, SFA1 and SFA_1 are equivalent, SFA2 and SFA_2 are equivalent, and SFA3 and SFA_3 are equivalent, with SFA3 including SFA3_1 and SFA3_2.

A first hole H_1 for fixing a fixing part 3000 to be described later may be disposed on the first dummy area 1510 and the second dummy area 1520 of the display panel 1000. The first hole H_1 may be a hole penetrating the first dummy area 1510 and the second dummy area 1520 in the third direction DR3. In some embodiments, a shape of the first hole H_1 may be circular, but is not necessarily limited thereto. The first hole H_1 may include a first_first hole on the first dummy area 1510 and a first_second hole H_1*b* on the second dummy area 1520. The first hole first_first on the first dummy area 1510 may be a hole into which a first screw SC_1 for fixing a first fixing tool 3100 to be described later is inserted. The first_second hole on the second dummy area 1520 may be a hole into which a second screw SC_2 for fixing a second fixing tool 3200 to be described later is inserted. In some embodiments, each of the first_first holes H_1*a* and the first_second holes H_1*b* may be in groups of five, but the number of the first_first holes H_1*a* and the first_second holes H_1*b* is not necessarily limited thereto.

Metal wires such as scan/data wires and touch wires may be disposed in the first dummy flat area and the second dummy flat area 1520*b*. Accordingly, since the metal wires such as the scan/data wires and the touch wires might not be disposed in the first bezel area 1400*a* and the second bezel area 1400*b*, an area of the active area AA may be increased by reducing the areas of the first bezel area 1400*a* and the second bezel area 1400*b*.

The dummy area 1500 may be slid or bent according to a behavior of the display device 1. A detailed description of the behavior of the dummy area 1500 of the display panel 1000 will be described later.

The display panel 1000 may further include a sub-area. The sub-area SBA may be disposed on one side of the first active area 1100 of the display panel 1000 in the second direction DR2. The sub-area SBA may be an area that is warped or bent. When the sub-area SBA is warped, the sub-area SBA may be disposed in a space formed by bending the second active area 1200 and the third active area 1300 of the display panel 1000 to overlap the first active area 1100 in the third direction DR3. The sub-area SBA may have a rectangular shape in a plan view, but is not necessarily limited thereto.

In some embodiments, a length of the sub-area SBA in the first direction DR1 may be substantially the same as a length of the first active area 1100 in the first direction DR1, but is not necessarily limited thereto. Alternatively, the length of the sub-area SBA in the first direction DR1 may be smaller than the length of the first active area 1100 in the first direction DR1. A length of the sub-area SBA in the second direction DR2 may be smaller than a length of the first active area 1100 in the second direction DR2.

A driving circuit DC and a circuit board CB may be disposed on one side surface of the sub-area SBA in the third direction DR3. The circuit board CB may be attached onto the sub-area SBA using an anisotropic conductive film (ACF). The circuit board CB may be electrically connected to a pad portion formed on the sub-area SBA. The circuit board CB may be a flexible film such as a flexible printed circuit board, a printed circuit board, or a chip on film. The driving circuit DC may be formed as an integrated circuit (IC) and be adhered onto the sub-area SBA in a chip on glass (COG) manner, a chip on plastic (COP) manner, or an ultrasonic manner. Alternatively, the driving circuit DC may be adhered onto the circuit board CB.

The roller R may be configured to assist a sliding operation of the display panel 1000. The roller R may include a first roller R1 and a second roller R2. The roller R may have a cylindrical shape extending in the second direction DR2. The roller R may be disposed in the bent area RA of the display device 1. For example, the first roller R1 may be disposed in the first display device bent area RA_1, and the second roller R2 may be disposed in the second display device bent area RA_2. The first roller R1 may be at least partially surrounded by the second active area 1200 in the first display device bent area RA_1. The second roller R2 may be at least partially surrounded by the third active area 1300 in the second display device bent area RA_2. A first joint part 2210 to be described later may be disposed between the first roller R1 and the second active area 1200. A second joint part 2220 to be described later may be disposed between the second roller R2 and the third active area 1300.

The support module 2000 may be configured to support the display panel 1000 by being attached to the bottom surface of the display panel 1000. An adhesive ADH may be interposed between the support module 2000 and the display panel 1000. In some embodiments, the adhesive ADH may be a pressure sensitive adhesive PSA, but is not necessarily limited thereto. The support module 2000 may include an upper plate 2100, a joint part 2200, and a lower plate 2300. The joint part 2200 may include a first joint part 2210 and a second joint part 2220, and the lower plate 2300 may include a first lower plate 2310 and a second lower plate 2320.

The upper plate 2100, the first joint part 2210, the second joint part 2220, the first lower plate 2310, and the second lower plate 2320 may have substantially the same relative positional relationship with respect to the display panel 1000. For example, when the display panel 1000 is unfolded flat without being bent, at least one plane parallel to the display panel 1000 may simultaneously pass through the upper plate 2100, the first joint part 2210, the second joint part 2220, the first lower plate 2310, and the second lower plate 2320.

The upper plate 2100 may be configured to support the first active area 1100 of the display panel 1000. The upper plate 2100 may be disposed between the first joint part 2210 and the second joint part 2220. The upper plate 2100 and the first active area 1100 of the display panel 1000 may overlap in the third direction DR3.

The upper plate 2100 may have a planar shape extending in the first direction DR1 and the second direction DR2. For example, the upper plate 2100 may have a substantially flat shape in a plan view. The upper plate 2100 may be disposed along a profile of the first active area 1100 of the display panel 1000 to have the same width (hereinafter, referred to as a "thickness") in the third direction DR3.

One side surface of the upper plate 2100 in the third direction DR3 may be a top surface to which the first active area 1100 of the display panel 1000 is attached, and the other side surface of the upper plate 2100 in the third direction DR3 may be a bottom surface on which an air gap to be described later is disposed.

The joint part 2200 may be configured to support the second active area 1200, the third active area 1300, the first dummy bendable area 1510a, and the second dummy bendable area 1520a of the display panel 1000. The joint part 2200 may include a plurality of joints SG extending in the second direction DR2 and spaced apart from each other in the first direction DR1. A width (hereinafter, referred to as 'thickness') of the plurality of joints SG in the third direction DR3 may be thicker than a thickness of the upper plate 2100. Accordingly, an air gap may be formed on a lower side of the upper plate 2100 as illustrated in FIG. 5. As the air gap is formed on the lower side of the upper plate 2100, a shock applied to the display panel 1000 may be alleviated. For example, when an object such as a user's pen falls on the first active area 1100 of the display panel 1000, the air gap may absorb a shock resulting therefrom. The joint part 2200 may include the first joint part 2210 and the second joint part 2220 as described above.

The first joint part 2210 may be configured to support the second active area 1200 and the first dummy bendable area 1510a. The first joint part 2210 may overlap the second active area 1200 and the first dummy bendable area 1510a as illustrated in FIG. 4. The upper plate 2100 may be disposed on one side of the first joint part 2210 in the first direction DR1. The first joint part 2210 may include a plurality of joints SG.

The second joint part 2220 may be configured to support the third active area 1300 and the second dummy bendable area 1520a. The second joint part 2220 may overlap the third active area 1300 and the second dummy bendable area 1520a as illustrated in FIG. 4. The upper plate 2100 may be disposed on the other side of the second joint part 2220 in the first direction DR1. The second joint part 2220 may include a plurality of joints SG.

The lower plate 2300 may be configured to support the first dummy flat area 1510b and the second dummy flat area 1520b. Similarly to the upper plate 2100, the lower plate 2300 may have a planar shape extending in the first direction DR1 and the second direction DR2. For example, the lower plate 2300 may have a substantially flat shape in a plan view. The lower plate 2300 may include a second hole H_2 penetrating through the lower plate 2300 in the third direction DR3. The second hole H_2 may include a second_first hole H_2a and a second_second hole H_2b. The lower plate 2300 may include the first lower plate 2310 and the second lower plate 2320 as described above.

The first lower plate 2310 may be configured to support the first dummy flat area 1510b. The first lower plate 2310 may be disposed along a profile of the first dummy flat area 1510b of the display panel 1000 to have the same width (hereinafter, referred to as a "thickness") in the third direction DR3. As illustrated in FIG. 4, a second_first hole H_2a for fixing a first fixing tool 3100 to be described later may be disposed in the first lower plate 2310. A shape of the second_first hole H_2a in a plan view may be circular.

The second lower plate 2320 may be configured to support the second dummy flat area 1520b. The second lower plate 2320 may be disposed along a profile of the second dummy flat area 1520b of the display panel 1000 to have the same width (hereinafter, referred to as a "thickness") in the third direction DR3. As illustrated in FIG. 4, a second_second hole H_2b for fixing a second fixing tool 3200 to be described later may be disposed in the second lower plate 2320. A shape of the second_second hole H_2b in a plan view may be circular.

The second_first hole H_2a may overlap the first_first hole H_1a disposed in the first dummy flat area 1510b. In addition, the second_second hole H_2b may overlap the first_second hole H_1b disposed in the second dummy flat area 1520b. A detailed description of the arrangement relationship between the first_first hole H_1a and the second_first hole H_2a and the arrangement relationship between the first_second hole H_1b and the second_second hole H_2b will be described later.

The fixing part 3000 may be configured to slide the display panel 1000 by fixing ends of both sides of the display panel 1000 in the first direction DR1. The fixing part 3000 may be disposed on both sides of the display panel 1000 in the first direction DR1 with reference to FIG. 3. The fixing part 3000 may include a mainspring or a motor for sliding the display panel 1000. The fixing part 3000 may be disposed in and fixed to the first dummy area 1510 and the second dummy area 1520. For example, the first fixing tool 3100 of the fixing part 3000 may be disposed in and fixed to the first dummy flat area 1510b of the first dummy area 1510, and the second fixing tool 3200 thereof may be disposed in and fixed to the second dummy flat area 1520b of the second dummy area 1520. A detailed description of a method in which the fixing part 3000 is fixed will be described later.

The panel storage container SD may be configured to store at least a portion of the display panel 1000 and the support module 2000. The panel storage container SD may include a first bent portion SD_1 including the first display device bent area RA_1, a second bent portion SD_3 including the second display device bent area RA_2, and a sidewall portion SD_2 connecting the first bent portion SD_1 and the second bent portion SD_3 to each other. A rail may be formed inside the sidewall portion SD_2 to guide the sliding operation of the display panel 1000.

Hereinafter, the arrangement and behavior of the display panel 1000, the support module 2000, and the fixing part 3000 according to the sliding operation of the display device 1 will be described in detail.

Figure 6:
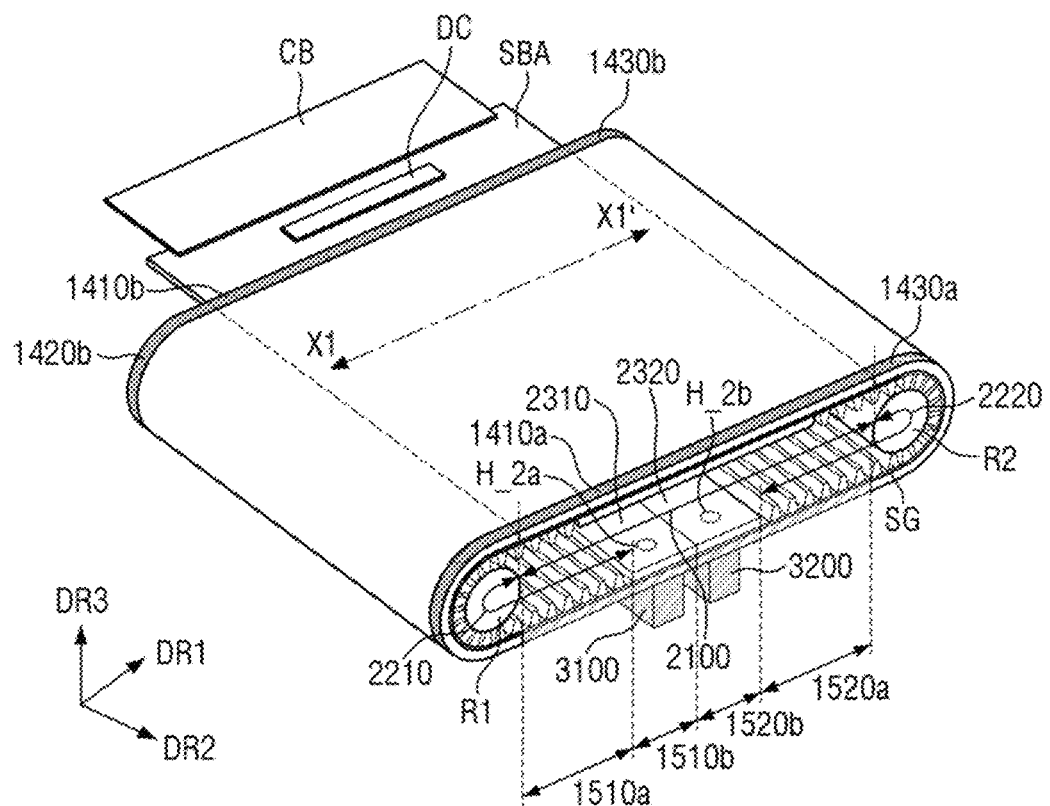
FIG. 6 is a perspective view illustrating a display panel in a first state in which the display device of FIG. 1 is contracted.
Figure 7:
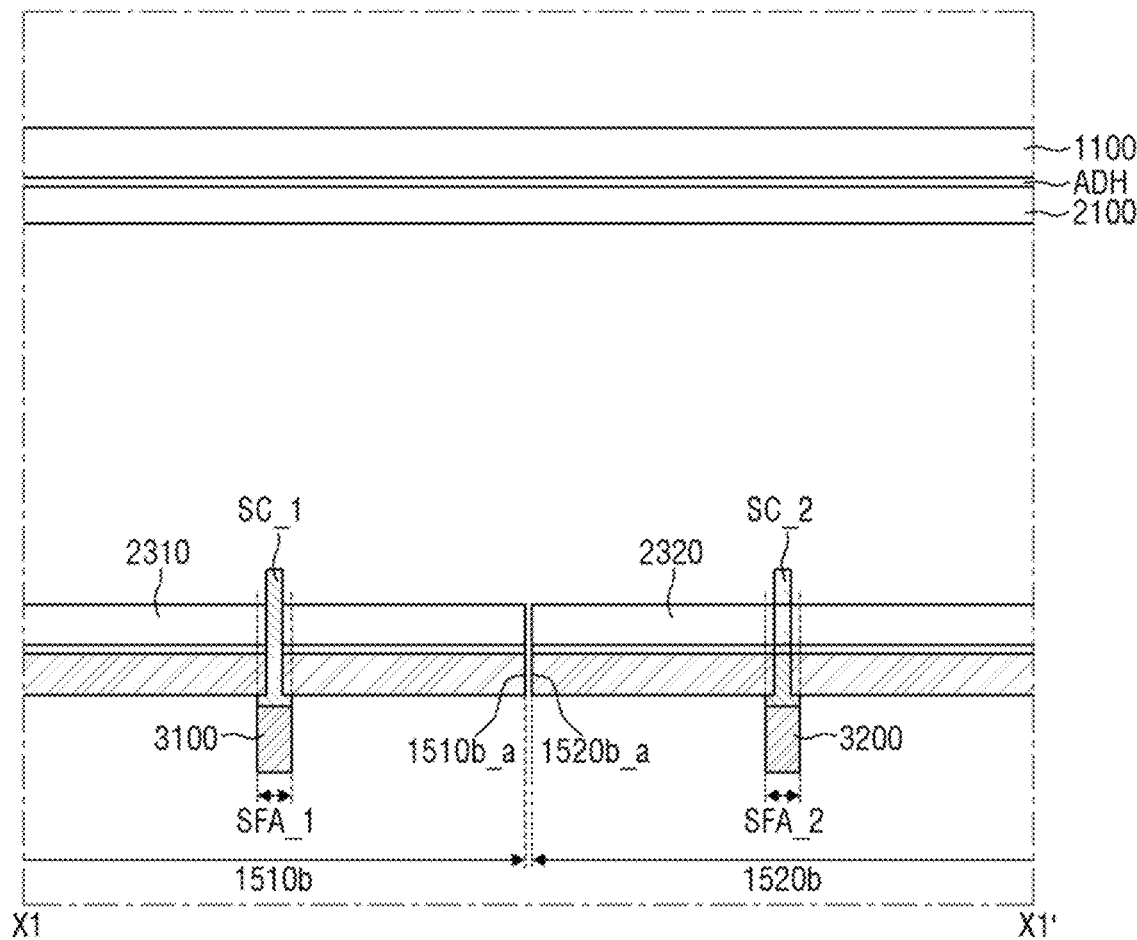
FIG. 7 is a cross-sectional view illustrating a cross-section taken along line X1-X1' of FIG. 6.
Figure 8:
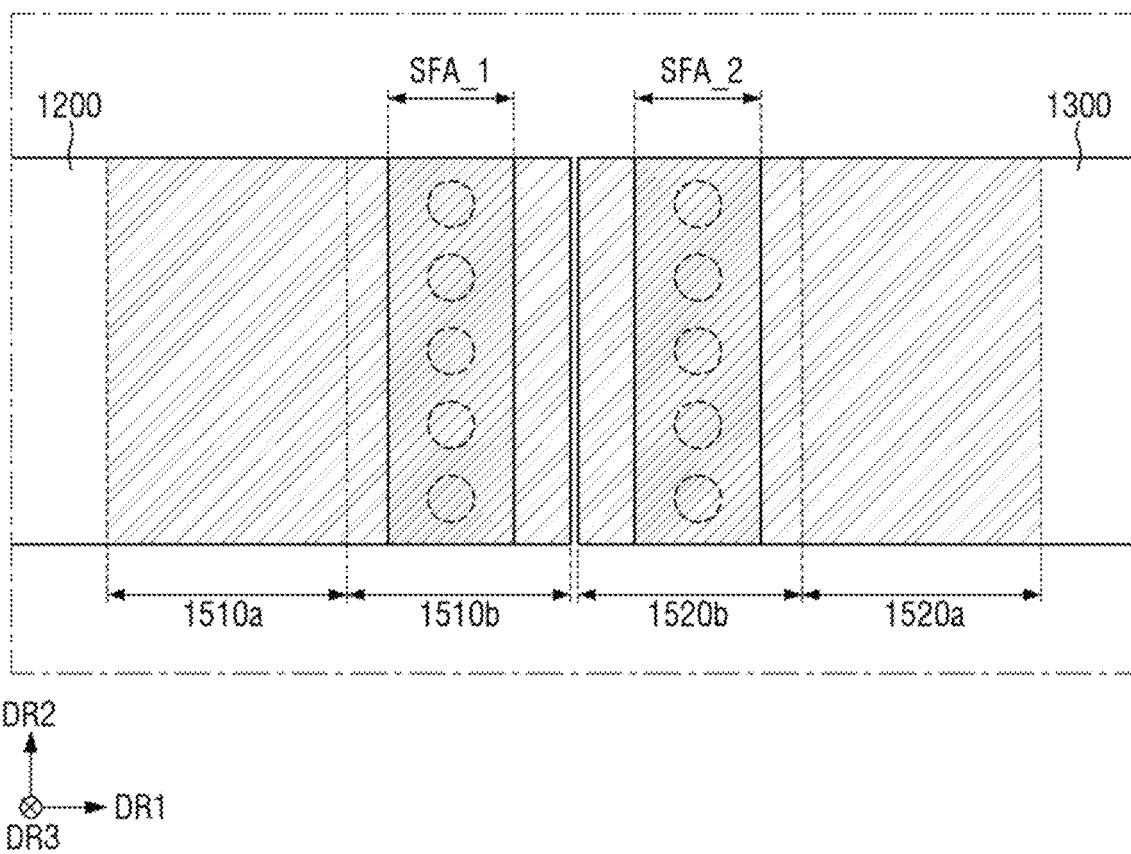
FIG. 8 is a plan view of a first dummy flat area and a second dummy flat area of FIG. 7 as viewed in a third direction.
Figure 9:
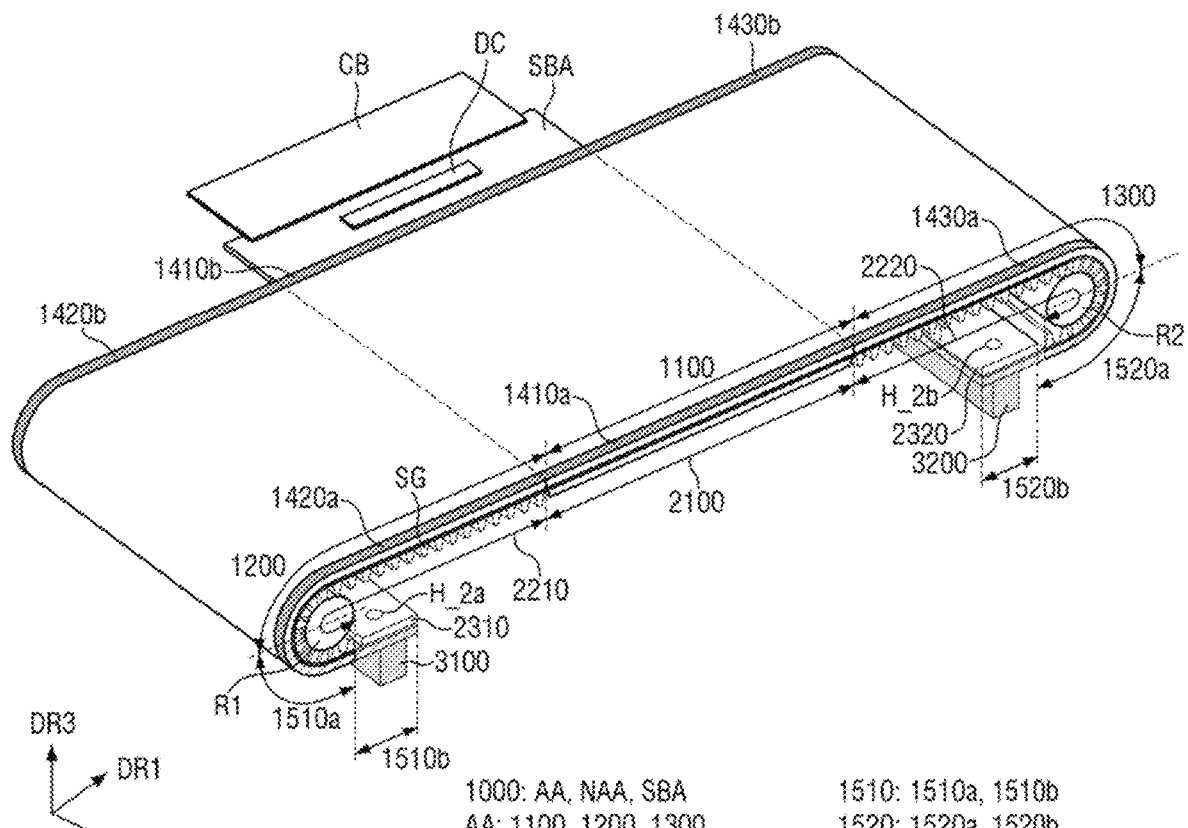
FIG. 9 is a perspective view illustrating a display panel in a third state in which the display device of FIG. 1 is maximally expanded.
Figure 10:
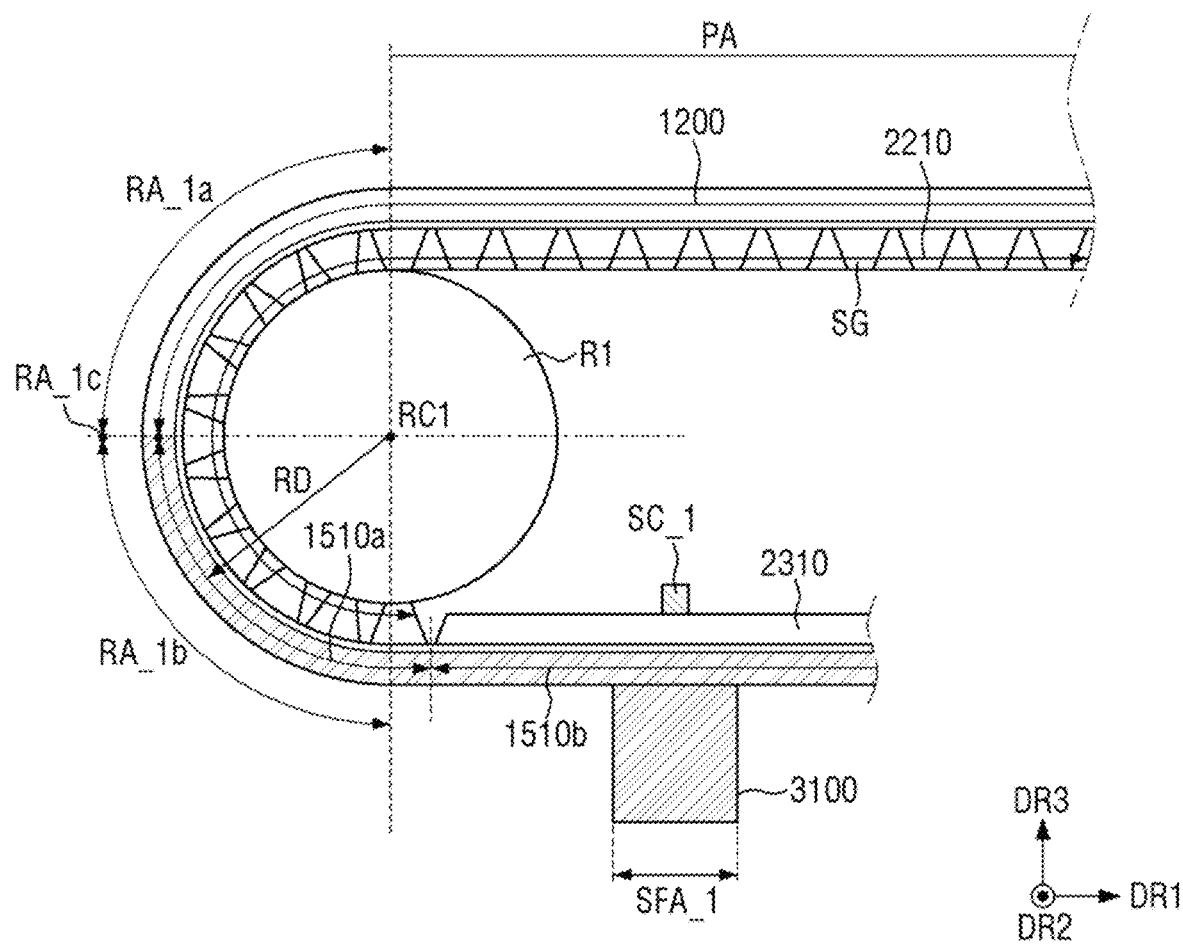
FIG. 10 is an enlarged view of a first display device bent area when the display device of FIG. 1 is in the third state.

FIG. 6 is a perspective view illustrating a display panel in a first state in which the display device of FIG. 1 is not expanded (e.g., in a contracted state). FIG. 7 is a cross-sectional view illustrating a cross-section taken along line X1-X1' of FIG. 6. FIG. 8 is a plan view of a first dummy flat area and a second dummy flat area of FIG. 7 as viewed in a third direction. FIG. 9 is a perspective view illustrating a display panel in a third state in which the display device of FIG. 1 is maximally expanded. FIG. 10 is an enlarged view of a first display device bent area when the display device of FIG. 1 is in the third state.

Referring to FIGS. 6 to 8, in the first state of the display device 1, according to an embodiment, a first dummy end surface 1510b_a and a second dummy end surface 1520b_a may meet each other. For example, the first dummy end surface 1510b_a and the second dummy end surface 1520b_a of the display device 1, according to an embodiment, may in contact with each other in the first state. Accordingly, when the display device 1, according to an embodiment, is in the first state, the second dummy flat area 1520b may be disposed on one side of the first dummy flat area 1510b of the display panel 1000 in the first direction DR1.

As described above, the first fixing tool 3100 may be fixedly disposed in the first fixing tool fixing area SFA_1 in the first dummy flat area 1510b. The first fixing tool 3100 may at least partially overlap the first fixing tool fixing area SFA_1. The first fixing tool fixing area SFA_1 might not exceed the first dummy flat area 1510b. The first fixing tool 3100 may be fastened to and fixed to the first dummy flat area 1510b and the first lower plate 2310 by the first screw SC_1. A detailed description thereof will be provided below.

In addition, the second fixing tool 3200 may be fixedly disposed in the second fixing tool fixing area SFA_2 in the second dummy flat area 1520b. The second fixing tool 3200 may at least partially overlap the second fixing tool fixing area SFA_2. The second fixing tool fixing area SFA_2 might not exceed the second dummy flat area 1520b. The second fixing tool 3200 may be fastened to and fixed to the second dummy flat area 1520b and the second lower plate 2320 by the second screw SC_2. A detailed description thereof will be provided below.

The first fixing tool fixing area SFA_1 and the second fixing tool fixing area SFA_2 may at least partially overlap the upper plate 2100 in the third direction DR3 when the display device 1, according to an embodiment, is in the first state as illustrated in FIG. 7.

In the first state in which the display device 1 is not expanded (e.g., a contracted state), the first dummy end surface 1510b_a and the second dummy end surface 1520b_a may be in contact with each other, and a separate area for fixing the fixing part 3000 might not be separately secured as the first fixing tool fixing area SFA_1 and the second fixing tool fixing area SFA_2 are disposed in the first dummy flat area 1510b and the second dummy flat area 1520b, respectively, such that an area of the bendable area of the display panel 1000 may be maximized. Accordingly, an expansion rate of the display area of the display device 1 may be maximized.

Referring to FIGS. 9 and 10, in the third state of the display device 1, according to an embodiment, a portion of the dummy area 1500 may cover a portion of the bent area. For example, in the case in which the display device 1, according to an embodiment, is in the third state, in the first display device bent area RA_1, the first dummy bendable area 1510a may slide up to a first maximum bent portion RA_1c positioned at the center of the first display device bent area RA_1. This is also the same in the second display device bent area RA_2. Hereinafter, the first display device bent area RA_1 will be mainly described.

As described above, the first display device bent RA_1 may be an area in which the display panel 1000 is convexly bent in a direction toward the other side in the first direction DR1 while having a predetermined radius of curvature RD.

The first display device bent area RA_1 may be divided into a first display device upper bent area RA_1a and a first display device lower bent area RA_1b based on the first maximum bent portion RA_1c at which the display panel 1000 is maximally bent. Based on the first maximum bent portion RA_1c, an upper portion of the first display device bent area RA_1, for example, one side in the third direction DR3, may be the first display device upper bent area RA_1a, and a lower portion of the first display device bent area RA_1, for example, the other side in the third direction DR3, may be the first display device lower bent area RA_1b. In some embodiments, one plane defined in the first direction DR1 and the second direction DR2 and passing through the first maximum bent portion RA_1c may pass through the center RC1 of the first roller R1, but is not necessarily limited thereto. For example, a length of the first display device upper bent area RA_1a may be ½ of a value obtained by multiplying a radius of curvature of the first display device bent area RA_1 by π(3.141592 . . . ), and may be the same as a length of the first display device lower bent area RA_1b, but is not necessarily limited thereto.

Some of the plurality of joints SG of the first joint part 2210 may be disposed in the first dummy bendable area 1510a. Accordingly, the first dummy bendable area 1510a may slide and be bent in the first display device bent area RA_1. When the display device 1, according to an embodiment, is in the third state, the one plane defined in the first direction DR1 and the second direction DR2 and passing through the first maximum bent portion RA_1c may pass through a boundary between the second active area 1200 and the first dummy bendable area 1510a. A length of the first dummy bendable area 1510a may be substantially equal to or longer than ¼ of a circumference of the first roller R1, but is not necessarily limited thereto. For example, the length of the first dummy bendable area 1510a may be equal to or greater than a value obtained by multiplying the predetermined radius of curvature of the first display device bent area RA_1 by π/2, but is not necessarily limited thereto. In some embodiments, the length of the first dummy area 1510 may be 12 mm or more, but is not necessarily limited thereto.

Since the first lower plate 2310 overlaps the first dummy flat area 1510b, the first dummy flat area 1510b might not be slid into the first display device bent area RA_1 by the shape of the first lower plate 2310. For example, the first dummy flat area 1510b may also serve as a stopper providing a limit to which the first dummy area 1510 is slid. In addition, since the bottom surface of the first dummy flat area 1510b is supported by the first lower plate 2310, the first fixing tool 3100 may be disposed on the top surface of the first dummy flat area 1510b.

In the case in which the display device 1, according to the embodiment, is in the third state due to the configuration as described above, since the second active area 1200 of the display panel 1000 does not overlap the first maximum bent portion RA_1c, stress applied to the second active area 1200 may be prevented. Accordingly, it is possible to prevent the display panel 1000 from lifting caused by the stress applied to the second active area 1200, thereby securing stability of the element disposed in the active area AA.

Hereinafter, a fastening relationship between the fixing part 3000, the dummy area 1500, and the lower plate 2300 will be described.

Figure 11:
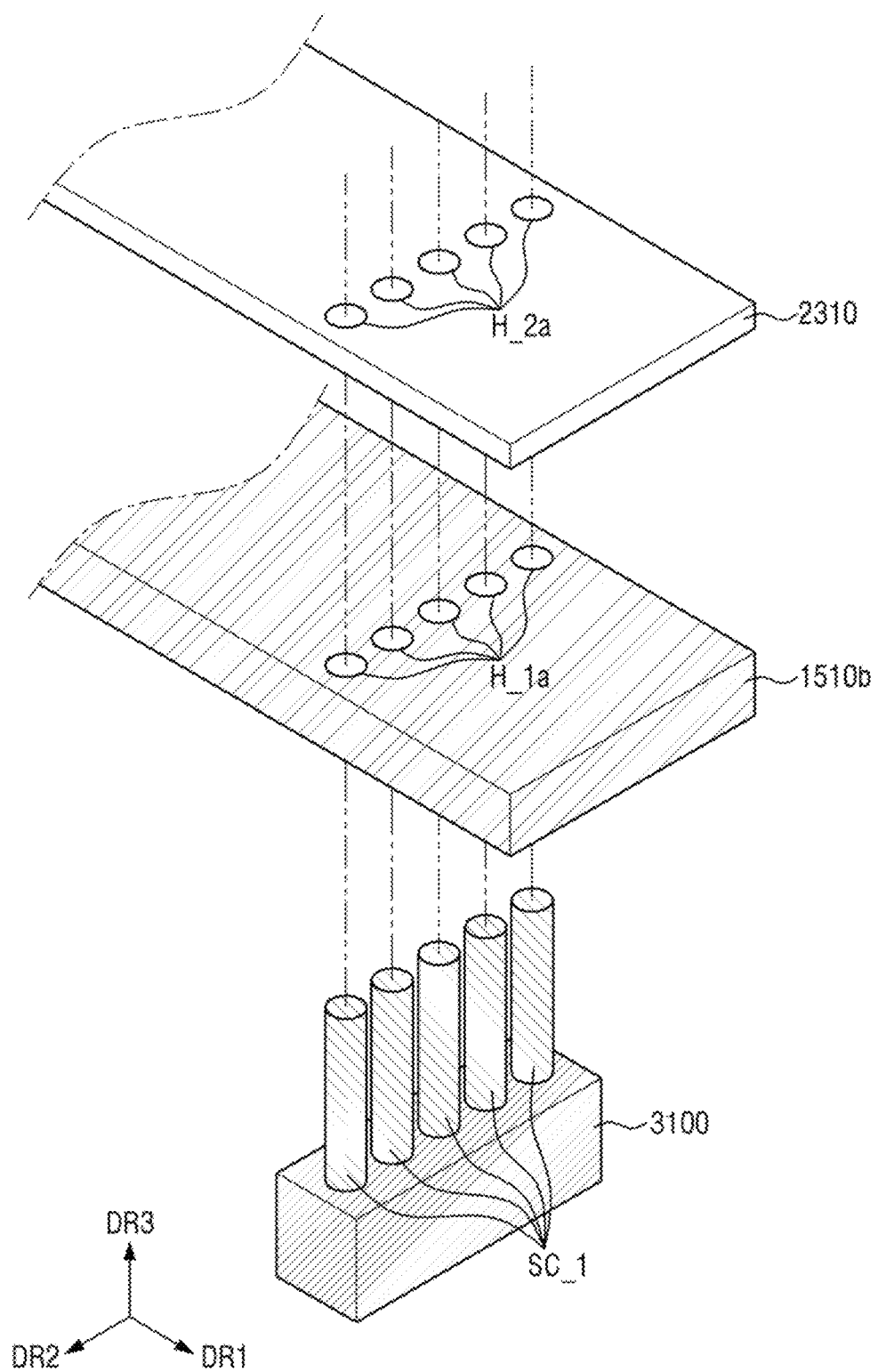
FIG. 11 is a structural view schematically illustrating a structure in which a first lower plate, a first dummy flat area, and a first fixing tool of the display device of FIG. 1 are coupled.

FIG. 11 is a structural view schematically illustrating a structure in which a first lower plate, a first dummy flat area, and a first fixing tool of the display device of FIG. 1 are coupled.

Referring to FIG. 11, the screw SC protruding from the fixing part 3000 may be fastened through the first hole H_1 of the dummy area 1500 and the second hole H_2 of the lower plate 2300, thereby fixing the fixing part 3000 to the dummy area 1500 and the lower plate 2300. Since a fastening relationship between the first fixing tool 3100 of the fixing part 3000, the first dummy area 1510, and the first lower plate 2310, and a fastening relationship between the second fixing tool 3200 thereof, the second dummy area 1520, and the second lower plate 2320 are the same as each other, the fastening relationship between the first fixing tool 3100, the first dummy area 1510, and the first lower plate 2310 will be mainly described below.

The first fixing tool 3100 may include a first screw SC_1 protruding in the third direction DR3. The first screw SC_1 may be of a pillar shape having a cross section corresponding to the shapes of the first_first hole H_1a of the first dummy flat area 1510b and the second_first hole H_2a of the first lower plate 2310. In some embodiments, the first screw SC_1 has a cylindrical shape having a circular cross-section corresponding to the shapes of the first_first hole H_1a of the first dummy flat area 1510b and the second_first hole H_2a of the first lower plate 2310, but is not necessarily limited thereto.

The first_first hole H_1a of the first dummy flat area 1510b and the second_first hole H_2a of the first lower plate 2310 may overlap each other in the third direction DR3. For example, the center of the first_first hole H_1a and the center of the second_first hole H_2a may overlap in the third direction DR3. In addition, a diameter of the first_first hole H_1a may be substantially the same as a diameter of the second_first hole. Accordingly, the first screw SC_1 of the first fixing tool 3100 may simultaneously penetrate through the first_first hole H_1a and the second_first hole H_2a to be fixed to the first dummy flat area 1510b and the first lower plate 2310.

Hereinafter, other embodiments will be described. In the following embodiments, the same components as those of the above-described embodiment will be denoted by the same reference numerals, and to the extent that an element is not described in detail, it may be assumed that the element is at least similar to a corresponding element that is described elsewhere within the present disclosure.

Figure 12:
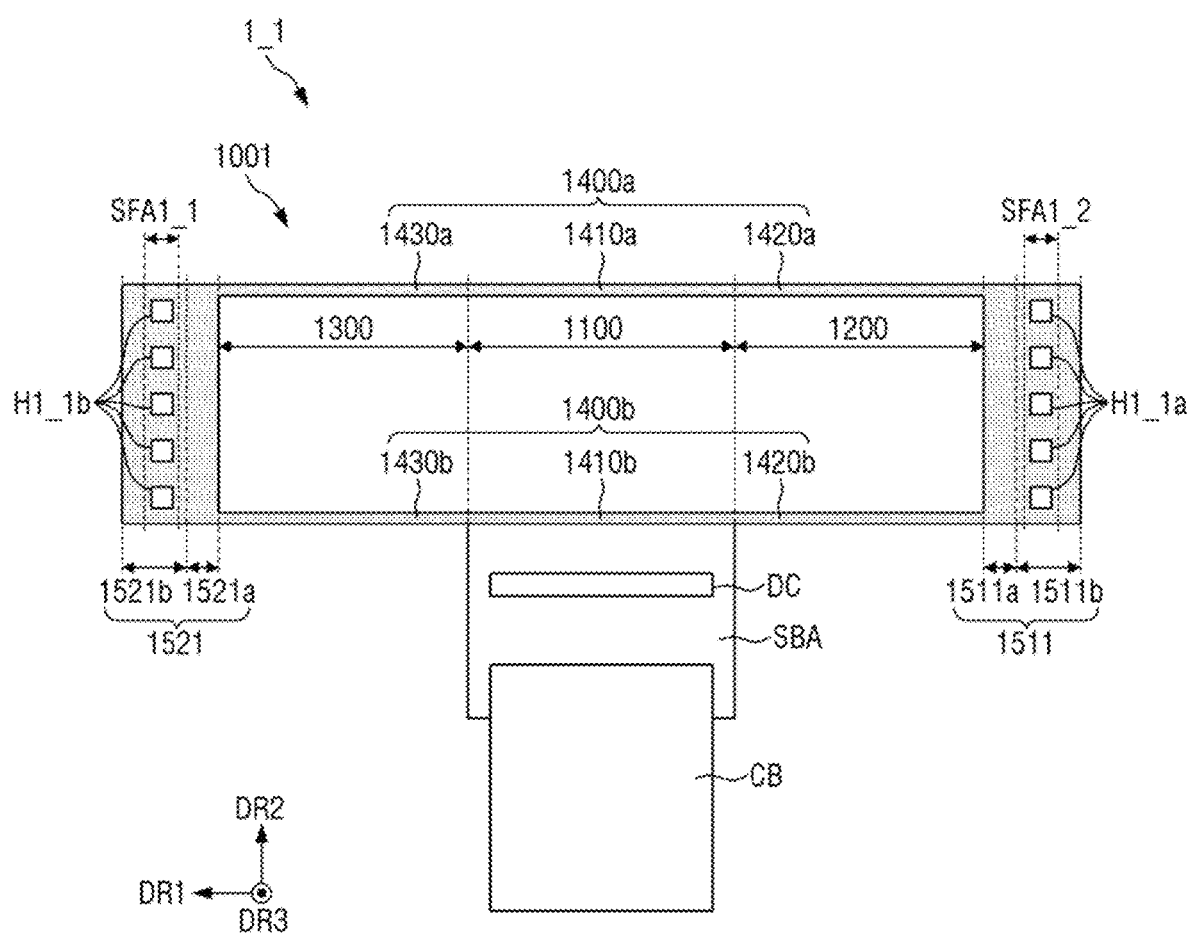
FIG. 12 is a plan view illustrating a display panel of a display device according to an embodiment.

FIG. 12 is a plan view illustrating a display panel of a display device according to an embodiment.

Referring to FIG. 12, a shape of a first hole H1_1a disposed in a first dummy area 1511 and a shape of a first hole H1_1b disposed in a second dummy area 1521 of a display device 1_1 according to the present embodiment may be a quadrilateral.

Figure 13:
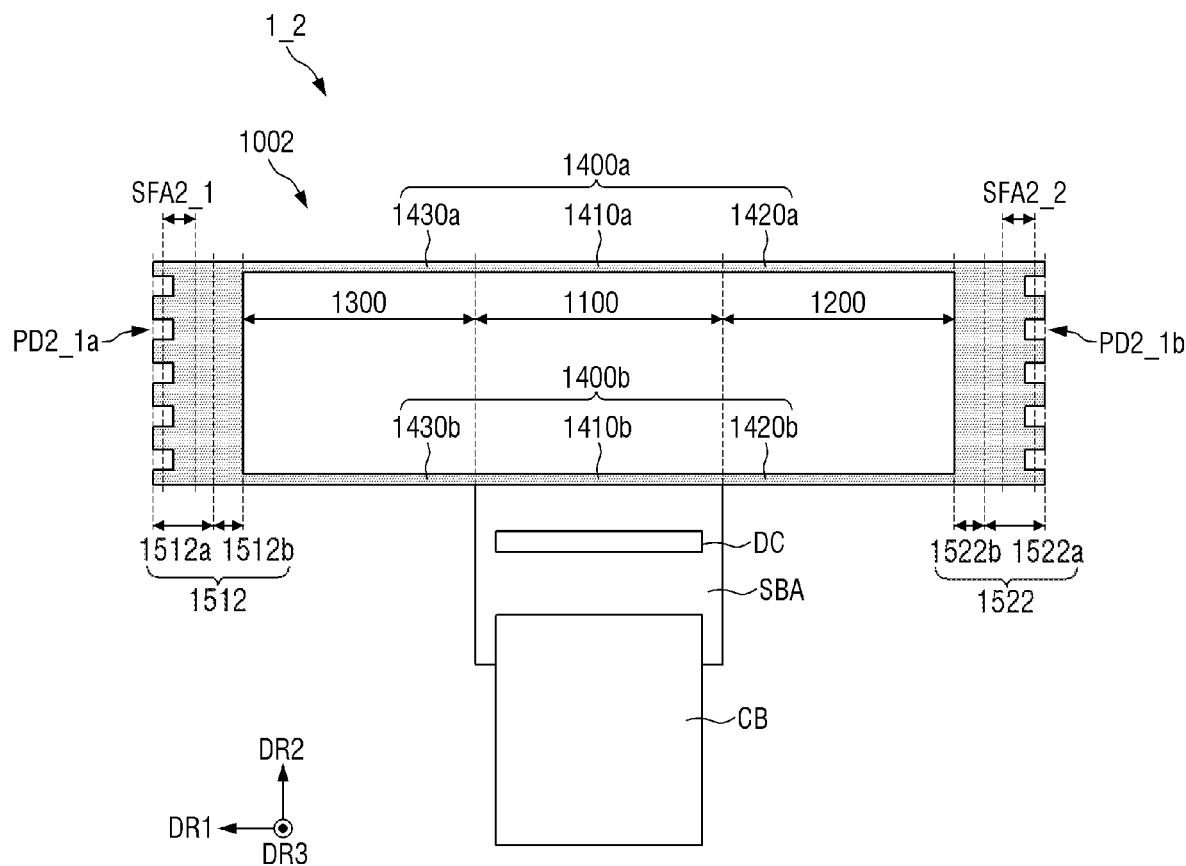
FIG. 13 is a plan view illustrating a display panel of a display device according to an embodiment.
Figure 14:
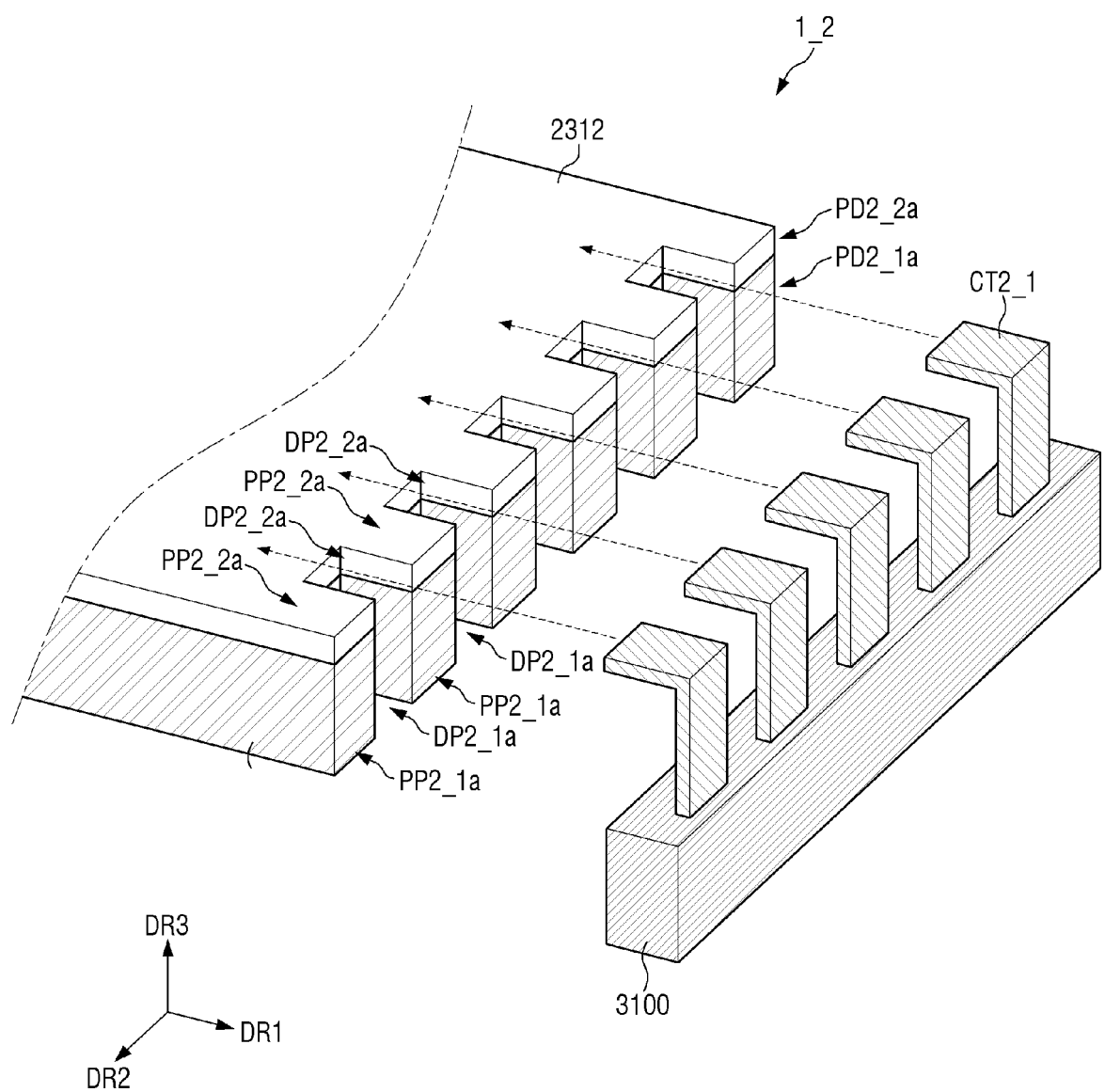
FIG. 14 is a structural view schematically illustrating a structure in which a first lower plate, a first dummy flat area, and a first fixing tool of the display device according to the embodiment of FIG. 13 are coupled.
Figure 15:
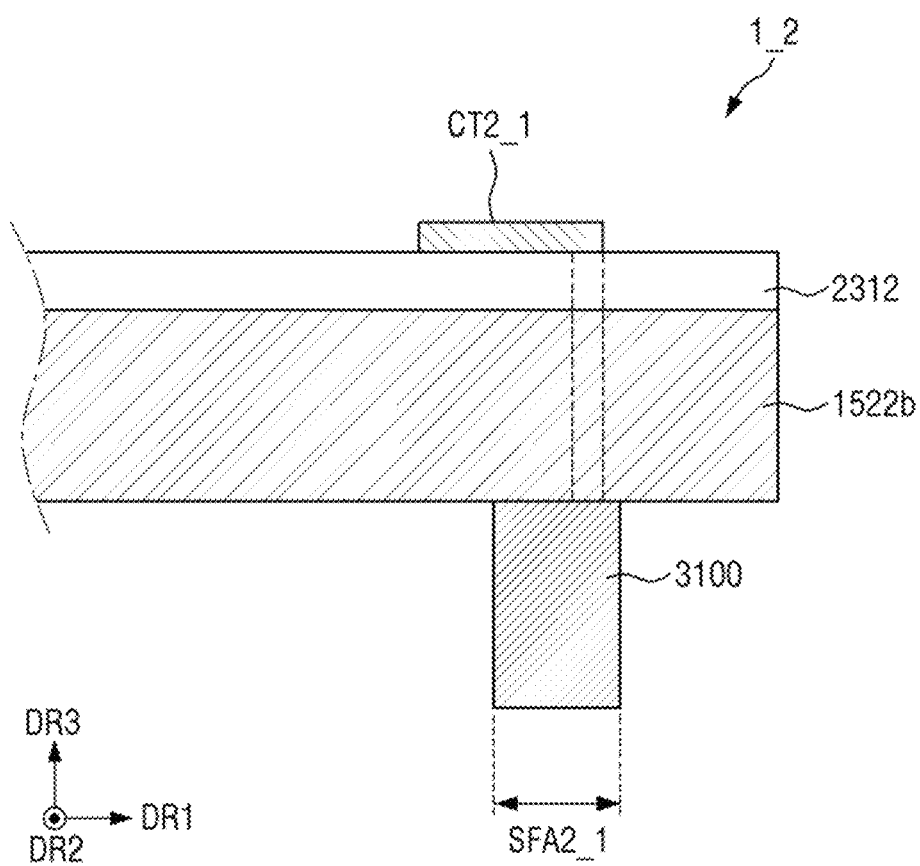
FIG. 15 is a cross-sectional view illustrating a state in which the first lower plate, the first dummy flat area, and the first fixing tool of the display device according to the embodiment of FIG. 13 are coupled.

FIG. 13 is a plan view illustrating a display panel of a display device according to an embodiment. FIG. 14 is a structural view schematically illustrating a structure in which a first lower plate, a first dummy flat area, and a first fixing tool of the display device according to the embodiment of FIG. 13 are coupled. FIG. 15 is a cross-sectional view illustrating a state in which the first lower plate, the first dummy flat area, and the first fixing tool of the display device according to the embodiment of FIG. 13 are coupled.

Referring to FIG. 13, a display panel 1002 of a display device 1_2, according to the present embodiment, may include a first concavo-convex portion PD2_1 including concavities and convexities in the first direction DR1 at ends of both sides thereof in the first direction DR1. For example, the first concavo-convex portion PD2_1 may include a first_first concavo-convex portion PD2_1a disposed at an end of the other side of a first dummy area 1512 (including 1512a and 1512b) in the first direction DR1, and a first_second concavo-convex portion PD2_1b disposed at an end of one side of a second dummy area 1522 (including 1522a and 1522b) in the first direction DR1. Since a fastening relationship between the first dummy area 1512, a first lower plate 2312, and a first fixing tool 3100 is substantially the same as that of the second dummy area 1522, a second lower plate 2322, and the second fixing tool 3200, the fastening relationship between the first dummy area 1512, the first lower plate 2312, and the first fixing tool 3100 will be mainly described below.

Referring to FIG. 14, the first_first concavo-convex portion PD2_1a of the first dummy flat area 1512b may include a plurality of first_first protrusion portions PP2_1a and a plurality of first_first concave portions DP2_1a. The first_first protrusion portion PP2_1a may have a shape protruding from the first dummy flat area 1512b in the first direction DR1, and the first_first concave portion DP2_1a may have a shape recessed into the first dummy flat area 1512b in the first direction DR1. The first_first protrusion portion PP2_1a and the first_first concave portion DP2_1a may be alternately disposed in the second direction DR2. Accordingly, the first_first concavo-convex portion PD2_1a may have concavities and convexities in the first direction DR1. For example, the first_first protrusion portions PP2_1a adjacent to each other may be spaced apart from each other in the second direction DR2 with the first_first concave portion DP2_1a interposed therebetween, and the first_first concave portions DP2_1a adjacent to each other may be spaced apart from each other in the second direction DR2 with the first_first protrusion portion PP2_1a interposed therebetween.

The first lower plate 2312 supporting the bottom surface of the first dummy flat area 1512b may include a second_first concavo-convex portion PD2_2a corresponding to the first_first concavo-convex portion PD2_1a of the first dummy flat area 1512b. For example, the first lower plate 2312 may include the second_first concavo-convex portion PD2_2a having concavities and convexities in the first direction DR1 at an end of one side thereof in the first direction DR1, and the second_first concavo-convex portion PD2_2a may include a plurality of second_first protrusion portions PP2_2a having a shape protruding from the first lower plate 2312 in the first direction DR1, and a plurality of second_first concave portions DP2_2a having a shape recessed into the first lower plate 2312 in the first direction DR1. The second_first protrusion portion PP2_2a and the second_first concave portion DP2_2a may be alternately disposed in the second direction DR2. Accordingly, the second_first concavo-convex portion PD2_2a may have concavities and convexities in the first direction DR1. For example, the second_first protrusion portions PP2_2a adjacent to each other may be spaced apart from each other in the second direction DR2 with the second_first concave portion DP2_2a interposed therebetween, and the second_first concave portions DP2_2a adjacent to each other may be spaced apart from each other in the second direction DR2 with the second_first protrusion portion PP2_2a interposed therebetween.

The first_first concavo-convex portion PD2_1a and the second_first concavo-convex portion PD2_2a may completely overlap in the third direction DR3. For example, the first_first protrusion portion PP2_1a and the second_first protrusion portion PP2_2a may completely overlap in the third direction DR3, and the first_first concave portion DP2_1a and the second_first concave portion DP2_2a may completely overlap in the third direction DR3. For example, a width in the first direction DR1 and a width in the second direction DR2 of the first_first protrusion portion PP2_1a and the second_first protrusion portion PP2_2a may be substantially the same, a width in the first direction DR1 and a width in the second direction DR2 of the first_first concave portion DP2_1a and the second_first concave portion DP2_2a may be substantially the same, and the first_first concavo-convex portion PD2_1a and the second_first concavo-convex portion PD2_2a may have substantially the same shape in a plan view. For example, the first_first concavo-convex portion PD2_1a and the second_first concavo-convex portion PD2_2a may be aligned. In some embodiments, the shape of the first_first concavo-convex portion PD2_1a and the second_first concavo-convex portion PD2_2a may be a rectangular shape, but is not necessarily limited thereto.

Referring to FIGS. 14 and 15, the first fixing tool 3100 may include a plurality of first contact portions CT2_1 protruding from the first fixing tool 3100 in the third direction DR3 and bent in an 'L' shape. In some embodiments, a width of the first contact portion CT2_1 in the second direction DR2 may be substantially the same as a width of the first_first concave portion DP2_1a and the second_first concave portion DP2_2a in the second direction DR2, but is not necessarily limited thereto. The first contact portions CT2_1 of the first fixing tool 3100 may be engaged with the first_first concave portions DP2_1a and the second_first concave portions DP2_2a to be fixed to the display panel 1000 as illustrated in FIG. 15. In this case, since the first contact portion CT2_1 is inserted by the width of the first_first protrusion portion PP2_1a and the second_first protrusion portion PP2_2a in the first direction DR1, the first fixing tool fixing area SFA_1 may be spaced apart from an end of one side of the first dummy flat area 1510b in the first direction DR1.

Figure 16:
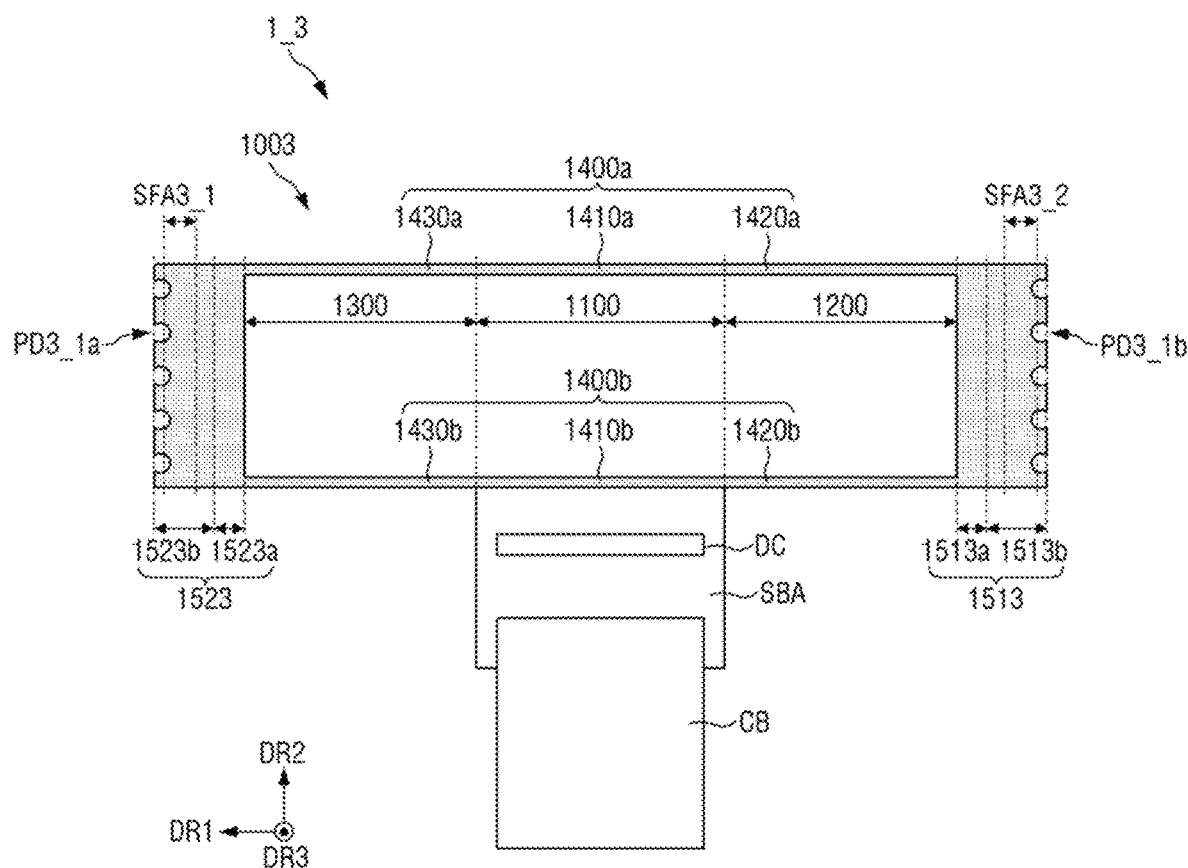
FIG. 16 is a plan view illustrating a display panel of a display device according to an embodiment.

FIG. 16 is a plan view illustrating a display panel of a display device according to an embodiment.

Referring to FIG. 16, a shape of a first_first concavo-convex portion PD3_1a and a second_first concavo-convex portion PD3_1b of a display device 1_3 according to the present embodiment in a plan view may be a semicircular shape that is concave in the first direction DR1.

In concluding the detailed description, those skilled in the art will appreciate that many variations and modifications can be made to the preferred embodiments without substantially departing from the principles of the present disclosure.

What is claimed is:

1. A display device, comprising: a display panel including a first active area, a second active area, and a third active area arranged in a first direction, wherein the first active area is disposed between the third active area and the second active area, wherein each of the second active area and the third active area is configured to slide in the first direction, wherein the display panel further includes a dummy first area disposed past the second active area and a second dummy area disposed past the third active area such that each of the first active area, the second active area, and the third active area are disposed between the first dummy area and the second dummy area; a joint part joint part including a plurality of joints, each of the plurality of joints extending in a second direction intersecting the first direction, wherein joints of the plurality of joints are spaced apart from each other in the first direction, wherein the joint part is attached to a bottom surface of the display panel, overlapping the second active area, the third active area, the first dummy area, and the second dummy area; a first fixing tool disposed on the first dummy area of the display panel, the first fixing tool amenable to a sliding behavior of the display panel; and a second fixing tool disposed on the second dummy area of the display panel, the second fixing tool amenable to the sliding behavior of the display panel, wherein the first fixing tool includes a first extension portion extending in the second direction over an entire width of the first dummy area in the second direction and projecting downwards in a third direction perpendicular to the first direction and the second direction, wherein the second fixing tool includes a second extension portion extending in the second direction over an entire width of the second dummy area in the second direction and projecting downwards in the third direction, over the entire width of the second dummy area, and wherein the first extension portion of the first fixing tool is coplanar with the second extension portion of the second fixing tool at both top and bottom surfaces.

2. The display device of claim 1,
wherein the first dummy area includes a first dummy bendable area and a first dummy flat area, the first dummy bendable area disposed between the second active area and the first dummy flat area,
wherein the second dummy area includes a second dummy bendable area and a second dummy flat area, the second dummy bendable area disposed between the third active area and the second dummy flat area, and
wherein the joint part is disposed on a bottom surface of the first dummy bendable area and a bottom surface of the second dummy bendable area, and does not overlap either the first dummy flat area or the second dummy flat area.

3. The display device of claim 2, further comprising:
a first lower plate disposed on a bottom surface of the first dummy flat area and not overlapping the first dummy bendable area; and
a second lower plate disposed on a bottom surface of the second dummy flat area and not overlapping the second dummy bendable area.

4. The display device of claim 3,
wherein the first fixing tool is disposed on the first dummy flat area and the second fixing tool is disposed on the second dummy flat area.

5. The display device of claim 2,
wherein the first dummy flat area includes a first dummy end surface opposite to a boundary surface between the first dummy flat area and the first dummy bendable area,
wherein the second dummy flat area includes a second dummy end surface opposite to a boundary surface between the second dummy flat area and the second dummy bendable area, and
wherein the first dummy end surface and the second dummy end surface are disposed on the same plane in a contracted state of the display panel.

6. The display device of claim 1,
further comprising a panel storage container accommodating the display panel,
wherein the panel storage container includes a first bent portion forming a first display device bent area in which the second active area of the display panel is bent to a predetermined radius of curvature,
wherein the first display device bent area includes a first maximum bent portion in which the second active area of the display panel is maximally bent, and
wherein the first dummy area is slid up to the first maximum bent portion in a third state in which the display panel is maximally slid in the first direction.

7. The display device of claim 6,
wherein a plane passing through the first maximum bent portion passes through a boundary between the second active area and the first dummy area.

8. The display device of claim 7,
wherein the first maximum bent portion is positioned at a center of the first display device bent area.

9. The display device of claim 8,
wherein a length of the first dummy area is greater than or equal to a value obtained by multiplying a radius of curvature of the first display device bent area by π/2.

10. A display device, comprising:
a display panel including an active area in which pixels are disposed, a dummy area adjacent to a first side of the active area in a first direction and adjacent to a second side of the active area, opposite to the first side of the active area, in the first direction, and a sub-area protruding from the active area in a second direction intersecting the first direction; and
a support module attached to a bottom surface of the display panel,
wherein the dummy area includes a first dummy bendable area disposed on the first side of the active area in the first direction, a first dummy flat area disposed on the first side of the active area, a second dummy bendable area disposed on the second side of the active area in the first direction, and a second dummy flat area disposed on the second side of the active area,
wherein the support module includes a plurality of joints overlapping the first dummy bendable area, the second dummy bendable area, and the active area and wherein joints of the plurality of joints are spaced apart from each other in the first direction,
wherein the first dummy flat area includes a first hole penetrating through the first dummy flat area, and the second dummy flat area includes a third hole penetrating through the second dummy flat area,
wherein the first dummy flat area includes a first dummy end surface opposite to a boundary surface between the first dummy flat area and the first dummy bendable area,
wherein the second dummy flat area includes a second dummy end surface opposite to a boundary surface between the second dummy flat area and the second dummy bendable area,
wherein the first dummy end surface and the second dummy end surface are disposed on a same plane in a contracted state of the display panel,
wherein the first dummy flat area includes a first dummy end surface opposite to a boundary surface between the first dummy flat area and the first dummy bendable area,
wherein the second dummy flat area includes a second dummy end surface opposite to a boundary surface between the second dummy flat area and the second dummy bendable area, and
wherein the first dummy end surface and the second dummy end surface are disposed on a same plane in a contracted state of the display panel.

11. The display device of claim 10,
wherein the support module further includes a first lower plate overlapping the first dummy flat area and a second lower plate overlapping the second dummy flat area,
wherein the first lower plate includes a second hole penetrating through the first lower plate and overlapping the first hole, and
wherein the second lower plate includes a fourth hole penetrating through the second lower plate and overlapping the third hole.

12. The display device of claim 11,
wherein the first hole, the third hole, the second hole, and the fourth hole each have a circular shape.

13. The display device of claim 12,
wherein a center of the first hole and a center of the second hole overlap each other, and a center of the third hole and a center of the fourth hole overlap each other.

14. The display device of claim 11,
further comprising a fixing part,
wherein the fixing part includes a first fixing tool disposed on the first dummy flat area and a second fixing tool disposed on the second dummy flat area,
wherein the first fixing tool includes a first screw fastened to the first hole and the second hole, and
wherein the second fixing tool includes a second screw fastened to the third hole and the fourth hole.

15. A display device, comprising:
a display panel including an active area in which pixels are disposed, a dummy area adjacent to a first side of the active area in a first direction and adjacent to a second side of the active area, opposite to the first side of the active area, in the first direction, and a sub-area protruding from the active area in a second direction intersecting the first direction; and
a support module attached to a bottom surface of the display panel,
wherein the dummy area includes a first dummy bendable area disposed on the first side of the active area in the first direction, a first dummy flat area disposed on the second side of the active area, a second dummy bendable area disposed on the second side of the active area in the first direction, and a second dummy flat area disposed on the second side of the active area,
wherein the support module includes a plurality of joints overlapping the first dummy bendable area, the second dummy bendable area, and the active area and wherein joints of the plurality of joints are spaced apart from each other in the first direction, and
wherein the first dummy flat area includes a first concavo-convex portion including concavities and convexities in the first direction disposed at an end of the first dummy flat area, and the second dummy flat area includes a third concavo-convex portion including concavities and convexities in the first direction disposed at an end of the second dummy flat area.

16. The display device of claim 15,
wherein the support module further includes a first lower plate overlapping the first dummy flat area and a second lower plate overlapping the second dummy flat area,
wherein the first lower plate includes a second concavo-convex portion including concavities and convexities in the first direction disposed at an end of the first lower plate,
wherein the second lower plate includes a fourth concavo-convex portion including concavities and convexities in the first direction formed at an end of the second lower plate, and
wherein the first concavo-convex portion and the second concavo-convex portion are aligned with each other, and the third concavo-convex portion and the fourth concavo-convex portion are aligned with each other.

17. The display device of claim 16,
further comprising a fixing part,
wherein the fixing part includes a first fixing tool disposed on the first dummy flat area and a second fixing tool disposed on the second dummy flat area,
wherein the first fixing tool includes a first contact portion fastened to the first concavo-convex portion and the second concave-convex portion, and wherein the second fixing tool includes a second contact portion fastened to the third concavo-convex portion and the fourth concavo-convex portion.

18. The display device of claim 15, wherein the first dummy flat area includes a first dummy end surface opposite to a boundary surface between the first dummy flat area and the first dummy bendable area, wherein the second dummy flat area includes a second dummy end surface opposite to a boundary surface between the second dummy flat area and the second dummy bendable area, and wherein the first dummy end surface and the second dummy end surface are disposed on a same plane in a contracted state of the display panel.

* * * * *